(12) United States Patent
Ringer et al.

(10) Patent No.: US 11,438,654 B2
(45) Date of Patent: Sep. 6, 2022

(54) GEOGRAPHICALLY TAILORED CONTENT MANAGEMENT SYSTEMS AND METHODS

(71) Applicants: Brian Ringer, Seattle, WA (US); Heng Cao, Sammamish, WA (US); Kenneth W. Murphy, Sammamish, WA (US); Darryl William Wood, Tacoma, WA (US); Gregory Welliver, Seattle, WA (US); Matthew James Eccles, Seattle, WA (US)

(72) Inventors: Brian Ringer, Seattle, WA (US); Heng Cao, Sammamish, WA (US); Kenneth W. Murphy, Sammamish, WA (US); Darryl William Wood, Tacoma, WA (US); Gregory Welliver, Seattle, WA (US); Matthew James Eccles, Seattle, WA (US)

(73) Assignee: RHAPSODY INTERNATIONAL INC., Seattle, WA (US)

( * ) Notice: Subject to any disclaimer, the term of this patent is extended or adjusted under 35 U.S.C. 154(b) by 749 days.

(21) Appl. No.: 16/369,365

(22) Filed: Mar. 29, 2019

(65) Prior Publication Data
US 2019/0301875 A1 Oct. 3, 2019

Related U.S. Application Data

(60) Provisional application No. 62/650,880, filed on Mar. 30, 2018.

(51) Int. Cl.
*H04N 21/45* (2011.01)
*H04N 21/458* (2011.01)
(Continued)

(52) U.S. Cl.
CPC ..... *H04N 21/4524* (2013.01); *G01C 21/3415* (2013.01); *G01C 21/3476* (2013.01);
(Continued)

(58) Field of Classification Search
CPC .......... H04N 21/4524; H04N 21/2187; H04N 21/23106; H04N 21/23424;
(Continued)

(56) References Cited

U.S. PATENT DOCUMENTS 5,440,351 A 8/1995 Ichino
7,089,301 B1 8/2006 Labio et al.
(Continued)

FOREIGN PATENT DOCUMENTS

KR 20130117409 A 10/2013

OTHER PUBLICATIONS

Vlad, Google Maps for Android update will let you add detours to your route, 2015, GSMARENA (Year: 2015).*
(Continued)

*Primary Examiner* — Aniss Chad
*Assistant Examiner* — Chase L Cooley
(74) *Attorney, Agent, or Firm* — ÆON Law, PLLC; Adam L. K. Phillip; Jonathan E. Olson

(57) ABSTRACT

Media-presentation-conscious scheduling protocols are disclosed that may associate a geographical location containing a thing with an identifier of the thing and allow later-found media works that pertain to the identifier to be presented at a mobile device before the device reaches a waypoint of the location. Alternatively or additionally, such protocols may respond to a predicted connectivity impairment of a traveling device by obtaining supplemental content to mitigate a predicted capacity shortage. Alternatively or additionally, such protocols may interrupt live stream content, insert on-demand content, and later return to live stream presentation automatically.

18 Claims, 21 Drawing Sheets

(51) Int. Cl.
| | |
|---|---|
| *H04N 21/61* | (2011.01) |
| *H04N 21/231* | (2011.01) |
| *H04N 21/234* | (2011.01) |
| *H04N 21/845* | (2011.01) |
| *H04N 21/258* | (2011.01) |
| *H04N 21/235* | (2011.01) |
| *H04N 21/414* | (2011.01) |
| *H04N 21/2187* | (2011.01) |
| *H04N 21/2387* | (2011.01) |
| *H04N 21/262* | (2011.01) |
| *H04N 21/84* | (2011.01) |
| *G06F 16/687* | (2019.01) |
| *G06F 16/68* | (2019.01) |
| *G01C 21/34* | (2006.01) |
| *H04N 21/41* | (2011.01) |

(52) U.S. Cl.
CPC .......... *G06F 16/686* (2019.01); *G06F 16/687* (2019.01); *H04N 21/2187* (2013.01); *H04N 21/2353* (2013.01); *H04N 21/2387* (2013.01); *H04N 21/23106* (2013.01); *H04N 21/23424* (2013.01); *H04N 21/25841* (2013.01); *H04N 21/26275* (2013.01); *H04N 21/4126* (2013.01); *H04N 21/41422* (2013.01); *H04N 21/458* (2013.01); *H04N 21/6181* (2013.01); *H04N 21/84* (2013.01); *H04N 21/8456* (2013.01)

(58) Field of Classification Search
CPC .......... H04N 21/2353; H04N 21/2387; H04N 21/25841; H04N 21/26275; H04N 21/41422; H04N 21/458; H04N 21/6181; H04N 21/84; H04N 21/8456; H04N 21/4126; G01C 21/3415; G01C 21/3476; G01C 21/3484; G06F 16/686; G06F 16/687; G06F 16/487
See application file for complete search history.

(56) References Cited

U.S. PATENT DOCUMENTS

| | | | |
|---|---|---|---|
| 8,352,989 B2 | 1/2013 | Mori et al. | |
| 8,463,989 B2 | 1/2013 | Mori et al. | |
| 8,706,732 B1 | 4/2014 | Janos et al. | |
| 9,148,907 B2 | 9/2015 | Cohen et al. | |
| 9,247,523 B1* | 1/2016 | Bhatia | H04W 4/02 |
| 9,445,138 B2 | 9/2016 | Walker et al. | |
| 9,456,469 B2 | 9/2016 | Cohen et al. | |
| 9,529,979 B2 | 12/2016 | Torgerson et al. | |
| 9,591,485 B2 | 3/2017 | Chang et al. | |
| 9,716,787 B1 | 7/2017 | Prakah-Asante et al. | |
| 9,876,762 B2 | 1/2018 | Barnes et al. | |
| 9,898,466 B2 | 2/2018 | Cao et al. | |
| 9,918,036 B2 | 3/2018 | Yu et al. | |
| 9,940,632 B2 | 4/2018 | Harb | |
| 10,151,594 B1 | 12/2018 | Chan et al. | |
| 10,536,749 B2 | 1/2020 | Eccles et al. | |
| 2003/0014767 A1 | 1/2003 | Stumphauzer | |
| 2003/0206596 A1 | 11/2003 | Carver et al. | |
| 2006/0224302 A1* | 10/2006 | Kwok | G08G 1/096844 701/416 |
| 2007/0028266 A1 | 2/2007 | Trajkovic et al. | |
| 2007/0074243 A1 | 3/2007 | Verhaegh et al. | |
| 2009/0005080 A1* | 1/2009 | Forstall | H04W 4/02 455/456.3 |
| 2009/0049045 A1 | 2/2009 | Askey et al. | |
| 2009/0055377 A1 | 2/2009 | Hedge et al. | |
| 2009/0112697 A1 | 4/2009 | Jung et al. | |
| 2009/0112713 A1 | 4/2009 | Jung et al. | |
| 2009/0112817 A1 | 4/2009 | Jung et al. | |
| 2009/0150156 A1 | 6/2009 | Kennewick et al. | |
| 2010/0088151 A1 | 4/2010 | Kim et al. | |
| 2010/0306792 A1 | 12/2010 | Li et al. | |
| 2010/0318544 A1 | 12/2010 | Nicolov | |
| 2012/0009890 A1 | 1/2012 | Curcio et al. | |
| 2012/0011552 A1 | 1/2012 | Yao | |
| 2012/0102517 A1 | 4/2012 | Yang et al. | |
| 2012/0110618 A1 | 5/2012 | Kilar et al. | |
| 2012/0222066 A1 | 8/2012 | Charania et al. | |
| 2013/0046766 A1 | 2/2013 | Shishido et al. | |
| 2013/0081084 A1 | 3/2013 | Scheer | |
| 2013/0117409 A1 | 5/2013 | Yang et al. | |
| 2013/0159552 A1* | 6/2013 | Xiang | H04L 69/40 709/246 |
| 2013/0276024 A1 | 10/2013 | Grant et al. | |
| 2014/0039881 A1 | 2/2014 | Levien et al. | |
| 2014/0095943 A1 | 3/2014 | Kohlenberg et al. | |
| 2014/0200038 A1* | 7/2014 | Rao | G01C 21/32 455/457 |
| 2014/0274078 A1 | 9/2014 | Hyde et al. | |
| 2014/0309864 A1 | 10/2014 | Ricci | |
| 2015/0066685 A1 | 3/2015 | Stoikov | |
| 2015/0094046 A1 | 4/2015 | Jung et al. | |
| 2015/0215738 A1 | 7/2015 | Frusina et al. | |
| 2015/0163636 A1 | 8/2015 | MacLeod et al. | |
| 2015/0312625 A1 | 10/2015 | Dewa et al. | |
| 2016/0127973 A1 | 5/2016 | Seo et al. | |
| 2016/0320194 A1 | 11/2016 | Liu et al. | |
| 2017/0019346 A1 | 1/2017 | Hayama | |
| 2017/0055077 A1 | 2/2017 | Merricks et al. | |
| 2017/0064360 A1 | 3/2017 | Houston et al. | |
| 2017/0134786 A1 | 5/2017 | Dame et al. | |
| 2017/0332119 A1 | 11/2017 | Casagrande | |
| 2018/0027389 A1 | 1/2018 | Shirakata et al. | |
| 2018/0053502 A1 | 2/2018 | Biadsy et al. | |
| 2018/0091863 A1 | 3/2018 | Anguiano | |
| 2018/0134171 A1 | 3/2018 | Hyde et al. | |
| 2018/0139501 A1 | 5/2018 | Eriksson et al. | |
| 2018/0160195 A1 | 6/2018 | Redmond et al. | |
| 2019/0037349 A1 | 1/2019 | Frusina et al. | |
| 2019/0052914 A1 | 2/2019 | Anderson | |
| 2019/0150156 A1 | 5/2019 | Ahmadi | |
| 2019/0301875 A1 | 10/2019 | Ringer et al. | |
| 2019/0306552 A1 | 10/2019 | Wood et al. | |

OTHER PUBLICATIONS

Extended European Patent Search Report and Search Opinion, EP Patent Application No. 19775243.9, dated Nov. 10, 2021, 10 pages.
"HbbTV 2.0.1 Specification with Errata #3 Integrated and Changes Marked", HbbTV Association, Feb. 16, 2018, pp. 1-310.
Podhradsky, P., "Evolution Trends in Hybrid Broadcast Broadband TV", Proceedings Elmar-2013, Croatian Society Electronics in Marine—Elmar, Sep. 25, 2013, pp. 7-10.

* cited by examiner

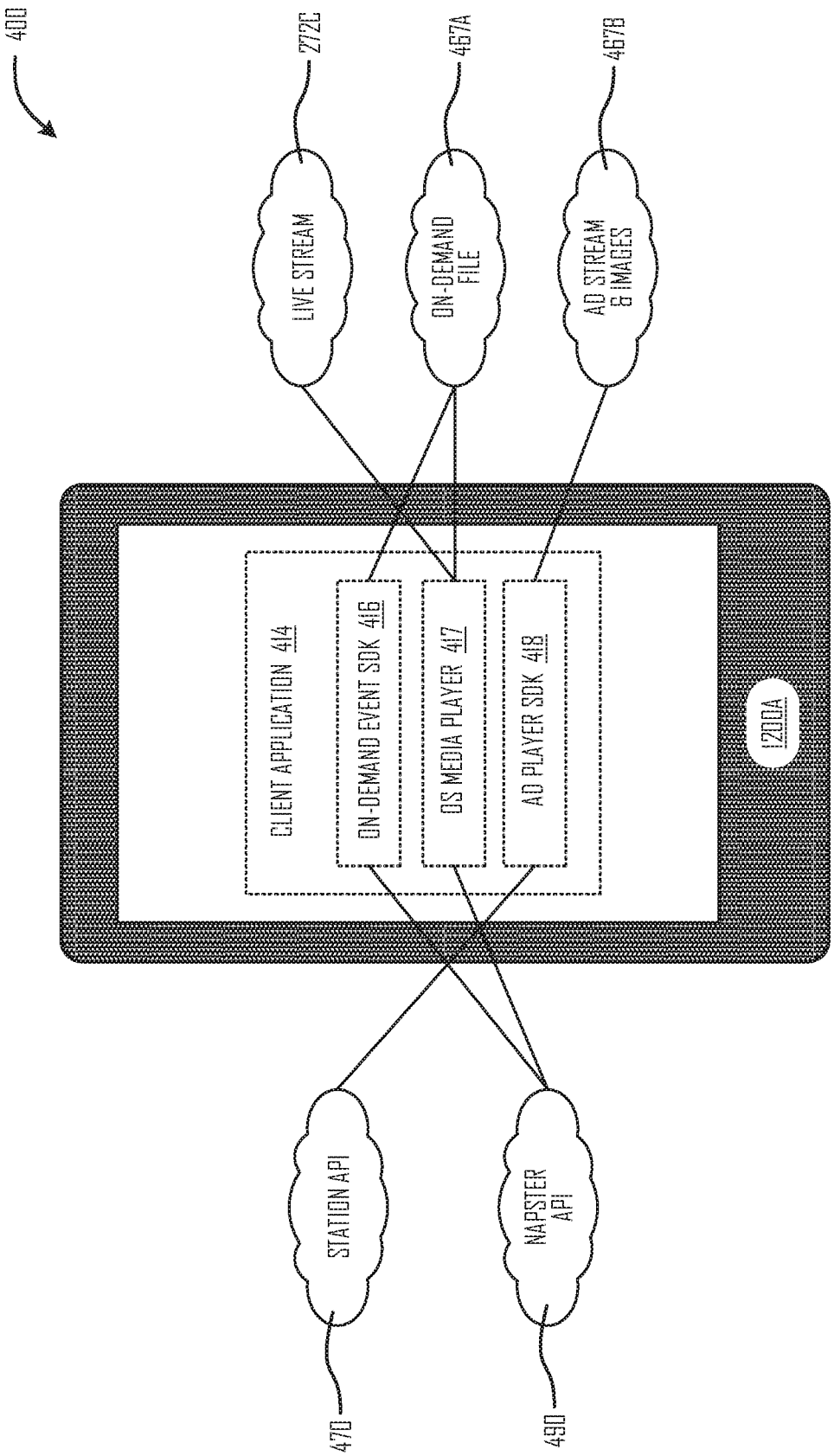

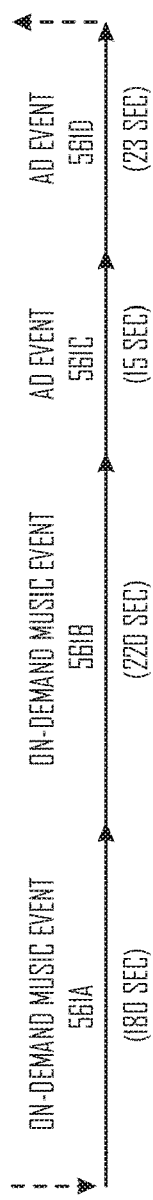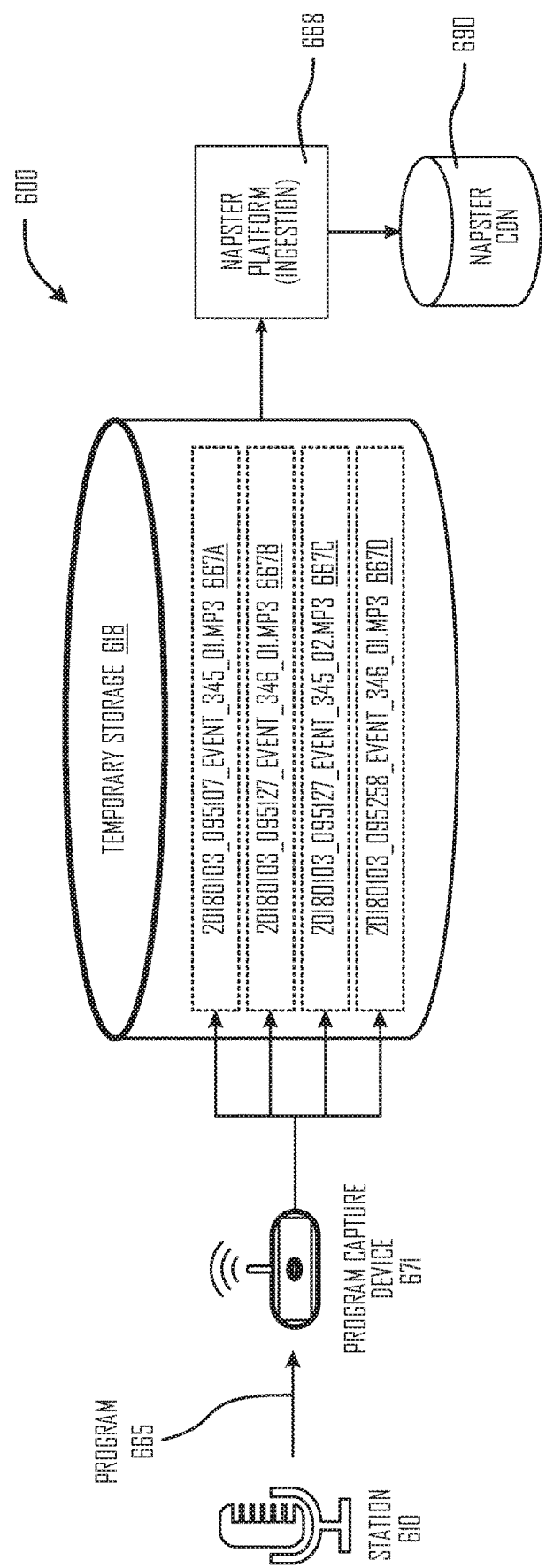

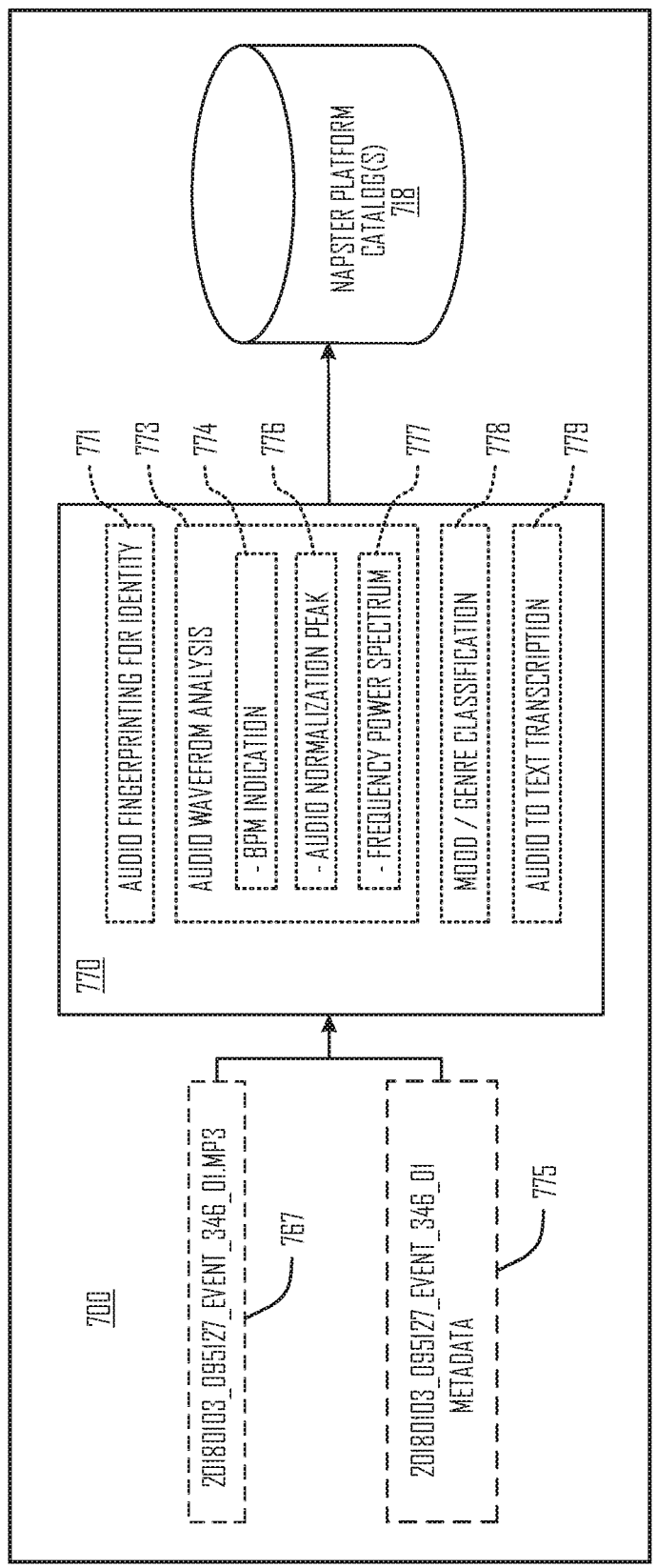

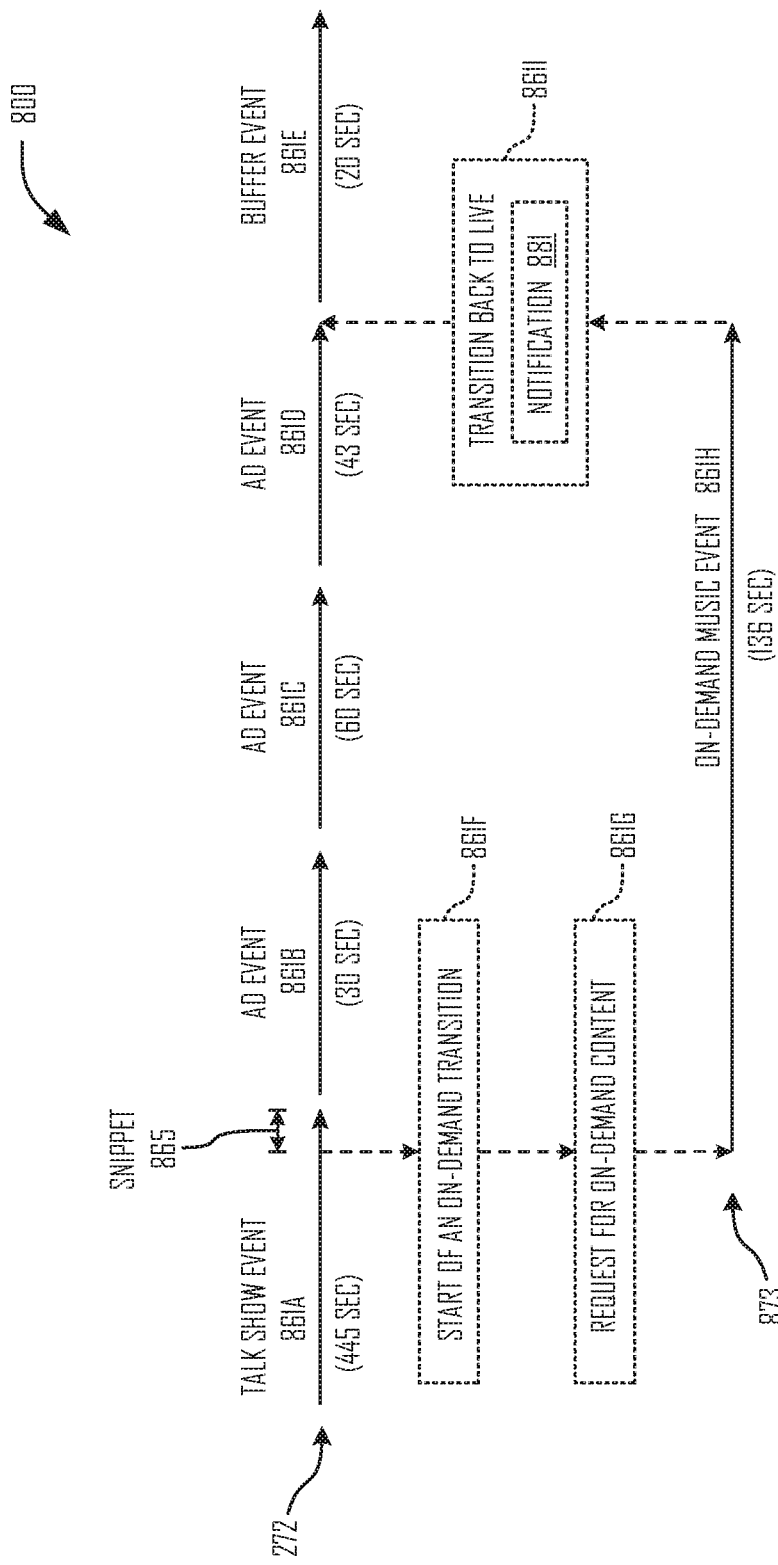

2205 — OBTAINING CATEGORICAL FIRST METADATA PERTAINING TO ONE OR MORE PROGRAMMED SEGMENTS OF A FIRST LIVE STREAM DURING A PRESENTATION OF THE FIRST LIVE STREAM WHEREIN THE CATEGORICAL FIRST METADATA INCLUDES A CATEGORY IDENTIFIER PERTAINING TO THE ONE OR MORE PROGRAMMED SEGMENTS INCLUDING A FIRST PROGRAMMED SEGMENT CURRENTLY BEING PRESENTED, WHEREIN THE FIRST PROGRAMMED SEGMENT INCLUDES A FIRST SNIPPET AT A CONCLUDING PORTION THEREOF

2225 — OBTAINING AN INDICATION OF A FIRST USER CONTROL SIGNALING A USER REQUEST FOR ON-DEMAND CONTENT

2240 — SELECTING A FIRST ON-DEMAND CONTENT ITEM

2255 — INTERRUPTING THE PRESENTATION OF THE FIRST LIVE STREAM BY INSERTING BOTH A TRANSITIONAL FIRST NOTIFICATION AND THE FIRST ON-DEMAND CONTENT ITEM SO AS TO DISPLACE AT LEAST SOME OF THE FIRST PROGRAMMED SEGMENT AS A CONDITIONAL RESPONSE TO ONE OR MORE INDICATIONS OF A FIRST USER PREFERENCE PERTAINING TO THE FIRST ON-DEMAND CONTENT ITEM OVER A SECOND USER PREFERENCE PERTAINING TO THE FIRST PROGRAMMED SEGMENT PARTLY BASED ON THE FIRST AND SECOND USER PREFERENCES AND PARTLY BASED ON A CATEGORY IDENTIFIER PERTAINING TO THE LATER-PROGRAMMED SECOND PROGRAMMED SEGMENT, WHEREIN THE FIRST USER PREFERENCE IS MANIFESTED AS AN ACTIVATION OF A FIRST USER CONTROL SIGNALING AN IMMEDIATE USER REQUEST FOR ON-DEMAND CONTENT

2290 — AUTOMATICALLY AND CONDITIONALLY RESUMING THE FIRST LIVE STREAM BY PRESENTING A RESUMPTIVE SECOND NOTIFICATION AND THEN THE LATER-PROGRAMMED SECOND PROGRAMMED SEGMENT AFTER A PRESENTATION OF THE FIRST ON-DEMAND CONTENT ITEM, WHEREIN A LOCAL PRESENTATION OF THE FIRST SNIPPET IS THEREBY OMITTED

END

GEOGRAPHICALLY TAILORED CONTENT MANAGEMENT SYSTEMS AND METHODS

RELATED APPLICATIONS

This application is related to U.S. Prov. App. 62/650,880 ("Supplemented Streaming Content Access Facilitation Systems and Methods," filed 30 Mar. 2018), incorporated herein by reference in its entirety for all purposes. This application is also related to U.S. application Ser. No. 16/369,232 ("Streaming Content Displacement Systems and Methods," filed 29 Mar. 2019) and to ("Adaptive Predictive Caching Systems and Methods"), both filed on even date herewith and incorporated herein by reference to the extent not inconsistent herewith.

BRIEF DESCRIPTION OF THE DRAWINGS

FIG. 4 depicts a system showing how stations may interact with a program capture or destination device according to one or more improved platform technologies.

FIG. 5 depicts an on-demand segment in which one or more improved technologies may be implemented.

FIG. 6 depicts a data handling platform in which one or more improved technologies may be implemented to process metadata associated with radio events.

FIG. 7 depicts another data handling system in which one or more improved technologies may be implemented.

FIG. 8 depicts a schematic illustration a partial substitution of one or more on-demand segment into a live stream according to one or more improved technologies.

FIG. 22 depicts a streaming content displacement operational flow in which one or more improved technologies may be incorporated.

DETAILED DESCRIPTION

Figure 1:
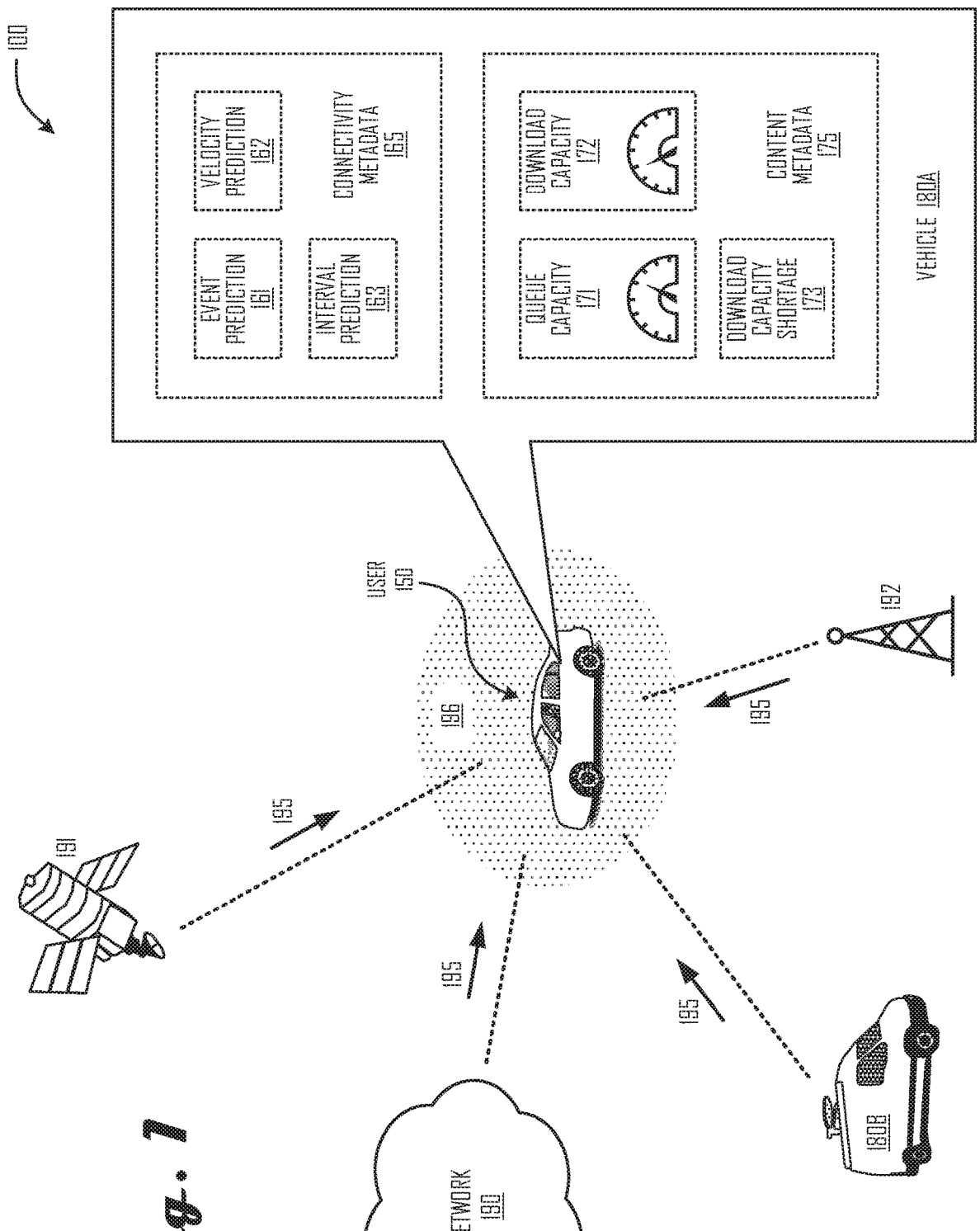
FIG. 1 schematically illustrates a system in which one or more vehicles may receive or otherwise interact with various sources of wireless signals according to one or more improved technologies.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote file servers, computer servers and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"Above," "aboard," "accelerating," "achieved," "adaptive," "after," "aggregate," "along," "among," "amplitude modulated," "any," "application-specific," "associated," "at least," "auditory," "automatic," "available," "away from," "based on," "because," "between," "cellular," "changed," "collaborative," "compared," "complete," "component," "comprising," "conditional," "configured," "conscious," "consecutive," "correlating," "corresponding," "current," "decelerating," "decreasing," "determined," "digital," "directly," "distributed," "downloaded," "during which," "effective," "encountered," "estimated," "exceeding," "executed," "explicit," "feature-based," "first," "following," "for," "frequency modulated," "generated," "geographical," "global," "greater," "high definition," "identified," "immediate," "impaired," "implemented," "implicit," "in lieu of," "in regard to," "included," "indicating," "integrated," "interpolated," "local," "low definition," "malicious," "mobile," "modified," "more," "more than," "mutually," "navigational," "near," "negatively," "networked," "newfound," "obtained," "of," "onboard," "otherwise," "particular," "partly," "pertaining," "playable," "positively," "predicted,"

"preferable," "prior," "private," "public," "purchased," "queued," "radio," "reached," "received," "remote," "requester-specified," "respective," "responsive," "scheduled," "second," "sequencing," "short," "signaling," "single," "smart," "so as," "special-purpose," "specific," "subsequent," "suitable," "supplemental," "taken," "temporal," "tentatively," "third," "through," "total," "toward," "transistor-based," "transported," "unable," "undergone," "undue," "updated," "updated," "upon," "via," "visual," "wherein," "wireless," "without," or other such descriptors herein are used in their normal yes-or-no sense, not merely as terms of degree, unless context dictates otherwise. In light of the present disclosure those skilled in the art will understand from context what is meant by "remote" and by other such positional descriptors used herein. Likewise they will understand what is meant by "partly based" or other such descriptions of dependent computational variables/signals. "Numerous" as used herein refers to more than one dozen. "Instantaneous" as used herein refers to having a duration of less than 0.1 seconds unless context dictates otherwise. "Immediate" as used herein refers to having a duration of less than 2 seconds unless context dictates otherwise. "Aboard" as used herein refers to being physically supported by or situated on a ship, aircraft, automobile, or other such vehicle unless context dictates otherwise. Circuitry or data items are "onboard" as used herein if they are aboard a vehicle or denoting or controlled from a facility or feature incorporated into the main circuit board of a computer or computerized device unless context dictates otherwise. Circuitry is "invoked" as used herein if it is called on to undergo voltage state transitions so that digital signals are transmitted therefrom or therethrough unless context dictates otherwise. One number is "on the order" of another if they differ by less than an order of magnitude (i.e. by less than a factor of ten) unless context dictates otherwise.

Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 schematically illustrates a system 100 in which one or more motorized passenger vehicles 180A-B (e.g. bearing a user 150 of a mobile device) may interact with each other (e.g. in an ad hoc network) or with one or more networks 190, communication satellites 191, communication towers 192, or other sources of wireless signals 195 received within or otherwise in a vicinity 196 of such vehicles, as described below. In some contexts a vehicle 180 may likewise contain one or more instances of event predictions 161, of velocity predictions 162, of interval predictions 163, or of other connectivity metadata 165 as further described below. Alternatively or additionally a vehicle 180 may contain one or more instances of queue capacities 171, of download capacities 172, of download capacity shortages 173, or of other such content metadata 175 as further described below.

Figure 2:
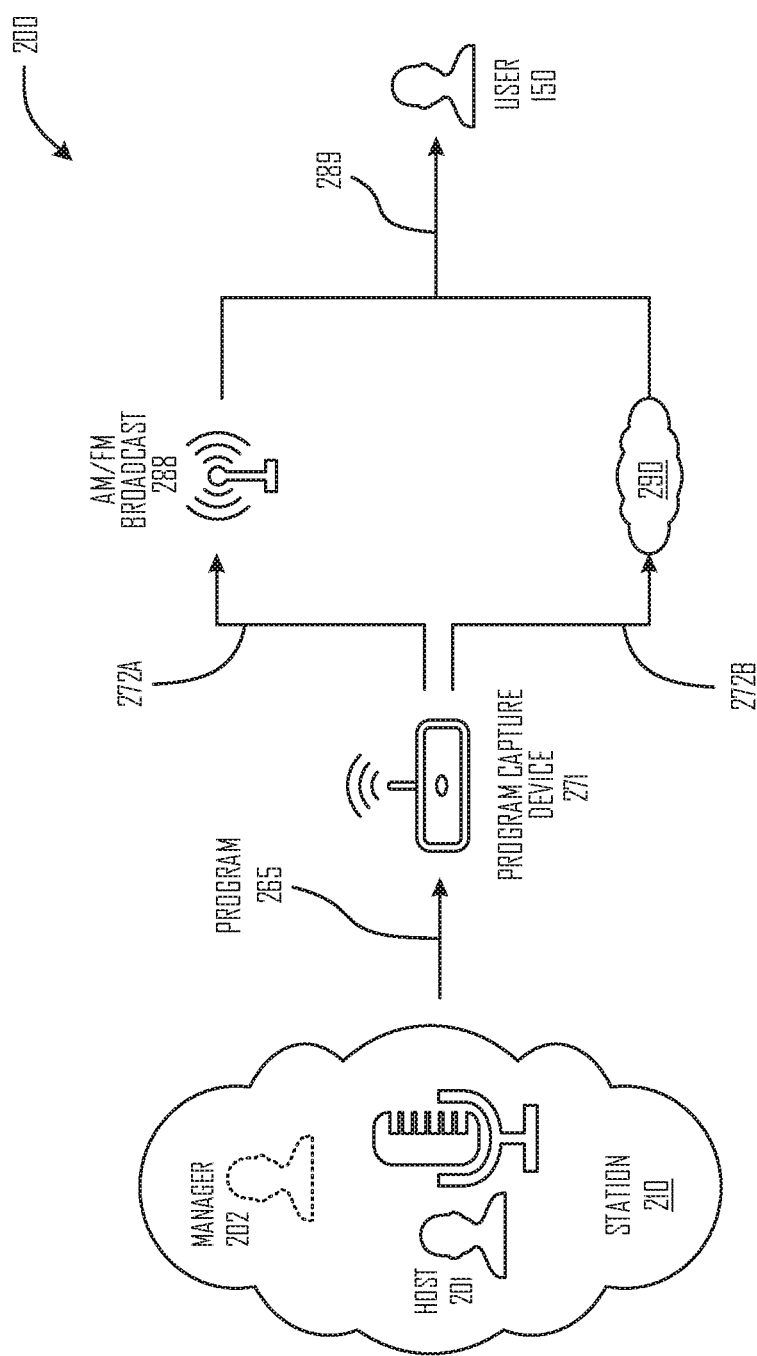
FIG. 2 depicts a system having different signal paths by which a streaming or other substantive content signal may reach a user/listener substantially in real time according to one or more improved technologies.

FIG. 2 depicts a system 200 having different signal paths by which a streaming or other substantive content signal (music or other programming, e.g.) may reach a user/listener substantially in real time (e.g. having less than one minute delay from one or more hosts 201 or programs 265 transmitted from a station 210 to a presentation 289 to a listener or other user 150). As described further below a Napster® Interactive Radio Service may be ingesting the metadata content from such feeds (e.g. via a user's device or network subsystem) in some variants, an accordingly a Station Program Manager 202 may ensure that this data is accurate when provided to a program capture device 271. Such metadata may be interleaved with content in a live stream 272A transmitted wirelessly as an AM/FM broadcast 288, for example. Alternatively or additionally such content and metadata may be transmitted as a simulcast live stream 272B or the like via one or more networks 290 comprising the internet. Either way the metadata from this feed may be used to do lookups across systems and having accurate data may raise the overall match rate over time, enhancing the experience of a user 150 receiving a presentation 289 of the content.

Some variants provide a method for switching from a live terrestrial radio stream to a digital stream (on-demand content 767, filler material for ad breaks, etc.) and back again into the live terrestrial stream. Such switching in relation to a streaming first channel may be in response to ad breaks or other content (that may optionally be replaced according to a user preference profile, e.g.). In many instances such transitions may be signaled in real time or by a static station log (a script for the day received via a second channel, e.g.) received less than 24 hours earlier.

Some variants provide a method for on-the-fly categorization or other identification of types of content on a radio stream (both in terms of music vs. talk vs. ads vs. weather, as well as in terms of a keyword or other topic identifier that indicates whether they're talking about the Philadelphia Eagles or Taylor Swift) and mining the data from that content. Such categorization or other identification may be used in various ways such as in a feeds recommendation engine, an automatic content insertion protocol, or other actions with regard to recently played segments (within a most recent 1 to 10 hours, e.g.) as described below.

Some variants provide a method by which a signal path (by which a user receives streaming or other content substantially in real time, e.g.) toggle back and forth between a terrestrial radio signal and a simulcast of that station (at least partly) based on (1) a signal strength, (2) a signal path bottleneck bandwidth, (3) a user preference, or (4) some combination of these. This might trigger an automatic and conditional signal rerouting on the fly between broadcast signal (AM or FM, e.g.) and an internet data signal (via a cellular network or Wi-fi hotspot, e.g.) as needed in response to one or more circumstances of the signal path (when a playback or other destination/presentation device passes enters or exits a tunnel, e.g.).

Figure 3:
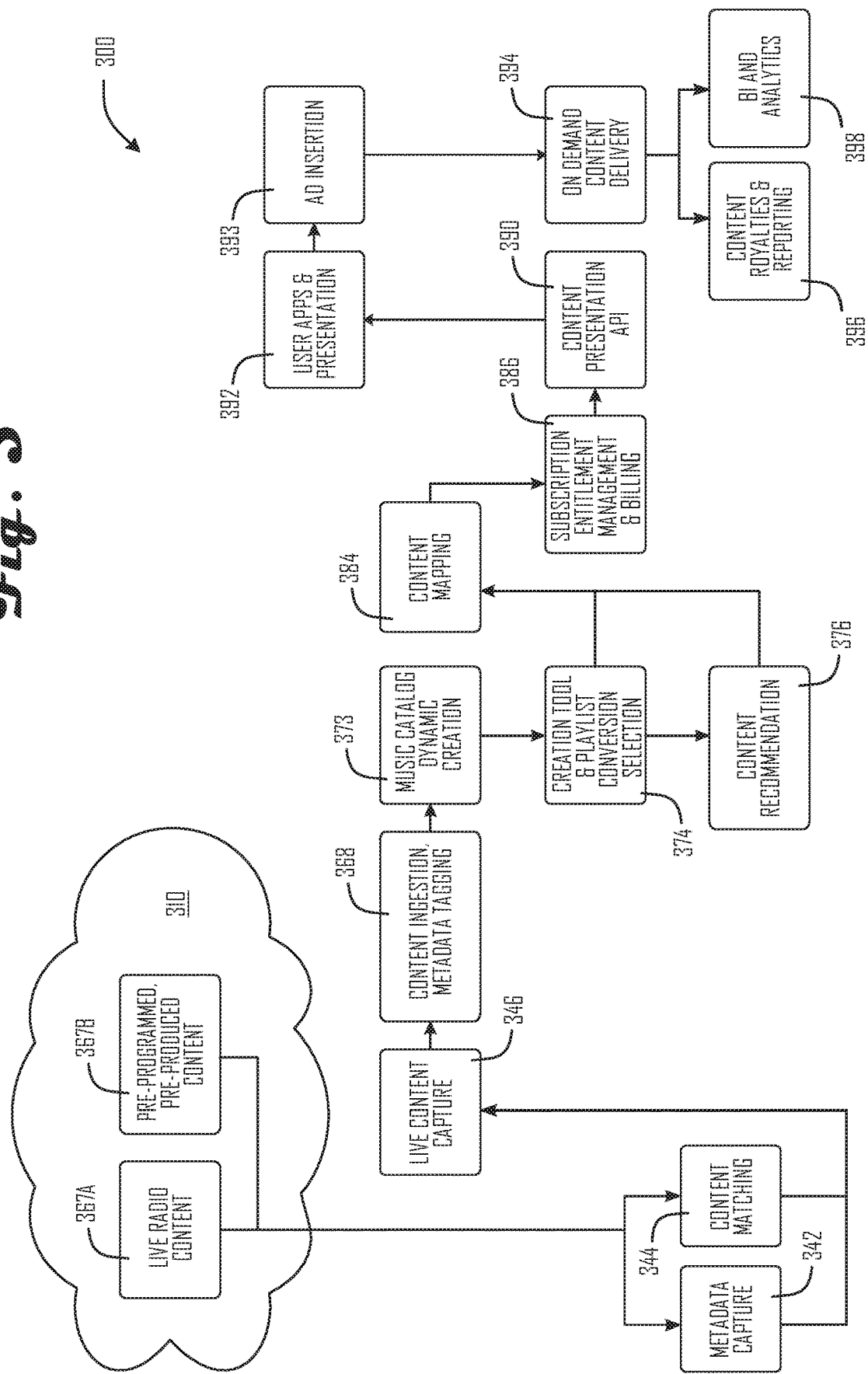
FIG. 3 depicts a system showing how one or more stations may interact with a platform that includes several modules configured according to one or more improved technologies.

FIG. 3 depicts a system 300 showing how one or more stations 210 may interact with a proprietary Napster® platform. Live radio content 367A and pre-programmed, pre-produced content 367B are provided from a station 210 or other content provider 310. A radio station 210 using many implementations described herein may continue to operate conventionally. In many variants live and programmed content will be queued up there and a broadcast stream will be sent out in a conventional manner. In some variants a client in the field will engage with that stream in one of two ways. As exemplified in FIG. 2 the stream may (optionally) be received through a local broadcast AM or FM signal in some variants, or in others it may be received as an Internet radio simulcast stream.

In either case of stream reception, a station 210 or other content provider 310 may use special purpose circuitry that monitors the content programming of the station and sends a feed of information and content, as further described below. In one or more metadata capture modules 342, audio or other content and related metadata for each event are received from one or more providers 310. For example the Napster® Platform has the ability to ingest music content delivered to it from a music label source. This platform may (optionally) be extended to be able to ingest additional content types and store this information in its database(s).

In some variants one or more content matching modules 344 may determine that content is categorized either as "matched" (against an existing catalog) or "not matched." If an event's content may be matched against an existing Napster® Catalog, then a pointer (trackId) to that content may be saved and the existing audio files saved on the Napster® CDN may be used. If an event's content cannot be matched against the existing Napster® Catalog, the content audio for that event may be saved/uploaded to the Napster® CDN and a reference to that location may be saved in the media table in the Napster® Platform. Non-music content may be saved in the same fashion as music content that may not be matched. This content may be uploaded to the Napster® CDN and reference pointers may be created and saved in the Napster® Platform Database. For example one or more of the following items may be used to attempt look up of a track id within the Napster® Catalog: Artist Name, Track Title, Track ISRC, Track Duration, Album Name, Album UPC, or some combination of these.

In some variants a matching algorithm may be used in which an initial search is performed. If no matches for a content identifier (e.g. a track name) are found, there are no match results. If one match is found, it is treated as an affirmative match. If more than one match is found, a refinement search is begun.

In some refinement searches, an artist name or similar identifier may be used to pare down the results. If within that artist's work a content identifier is found, there it is treated as an affirmative match. Otherwise if an artist string contains "featuring" or "feat," a first several characters of an artist identifier (e.g. 35-50%) is used in an additional attempt to match. If this is not successful a Levenshtein Distance (LD) operation is performed on the "featuring" or "feat" trimmed artist string and attempt to match it to the artist names in the results. If more than a threshold number (e.g. 4 or 5) of operations of LD and the distance is less than 40, then it's considered a "close enough match." Otherwise a result is deemed "no match." (Note: The results are looped over and this just returns the first occurrence, if the same track and artist match is in the results more than once, all others are ignored.)

As used herein "streaming" data refers to that which is transmitted as a packetized or other generally continuous flow such that a serial presentation thereof (via a speaker or display screen, e.g.) may begin while other data of the flow is still being received. As used herein a "serial" presentation is one in which numerous (i.e. more than 12) distinct elements (scenes, words, gestures, or other humanly perceptible events, e.g.) are presented in a cognitive series. As used herein "live stream" data refers to streaming real time content portraying one or more live performances (utterances or bodily movements, e.g.) or recorded content playbacks remotely broadcast or simulcast less than one hour ago to allow local presentation 289.

In some variants one or more live content capture modules 346 may operate on streaming content (e.g. within a program capture device 271 or server as described below). This allows portions of such content to be stored and later replayed in an on-demand segment. The content may optionally be captured at one or more live streams 272 before being broadcast out to the various stream types. The content may initially be captured as raw Pulse Code Modulation (PCM) audio. The device may then, encode the content to mp3 and upload it to a temporary storage location. See FIG. 13.

The Napster® Ingestion Service may scan such a temporary storage location for new files added at periodic intervals. When new content is found, it may be ingested into the Napster® Catalog for the region where the station is broadcasted from. The content may be published and available within a few minutes (e.g. on the order of 20 minutes) of the end of the original broadcasted event. For example, if the station is KZOK in Seattle the content may be ingested into the Napster® catalog for the United States. Napster® may re-encode the content to support additional audio formats in order to support devices and applications that do not support mp3. This content may be available in the same way that content is ingested from the music labels for audio content.

In some variants one or more content ingestion and metadata tagging modules 368 of an Application Programming Interface (e.g. an API like that of FIG. 11) may reside in a program capture device 271 (e.g. residing at station 210). This facilitates capture of information regarding the programmed events happening in the live broadcast stream. This may be done by the program capture device 271 sending feed data in JSON format to a central server location to be ingested by a Napster® Interactive Radio Service. Such services may test to see if there is new information in the feed at regular intervals or otherwise on occasion. For an optimization, such services may be able to look at the latest event duration to determine next polling interval.

In some variants a program capture device 271 may (optionally) send event audio segments to a Napster® Interactive Radio Service for ingestion. This may be done through the use of a temporary storage location operated by one or more servers like that of FIG. 13. In some variants this may be implemented by a service that provides object storage through a web service interface (e.g. a "simple storage service" offered by Amazon Web Services).

Figure 9:
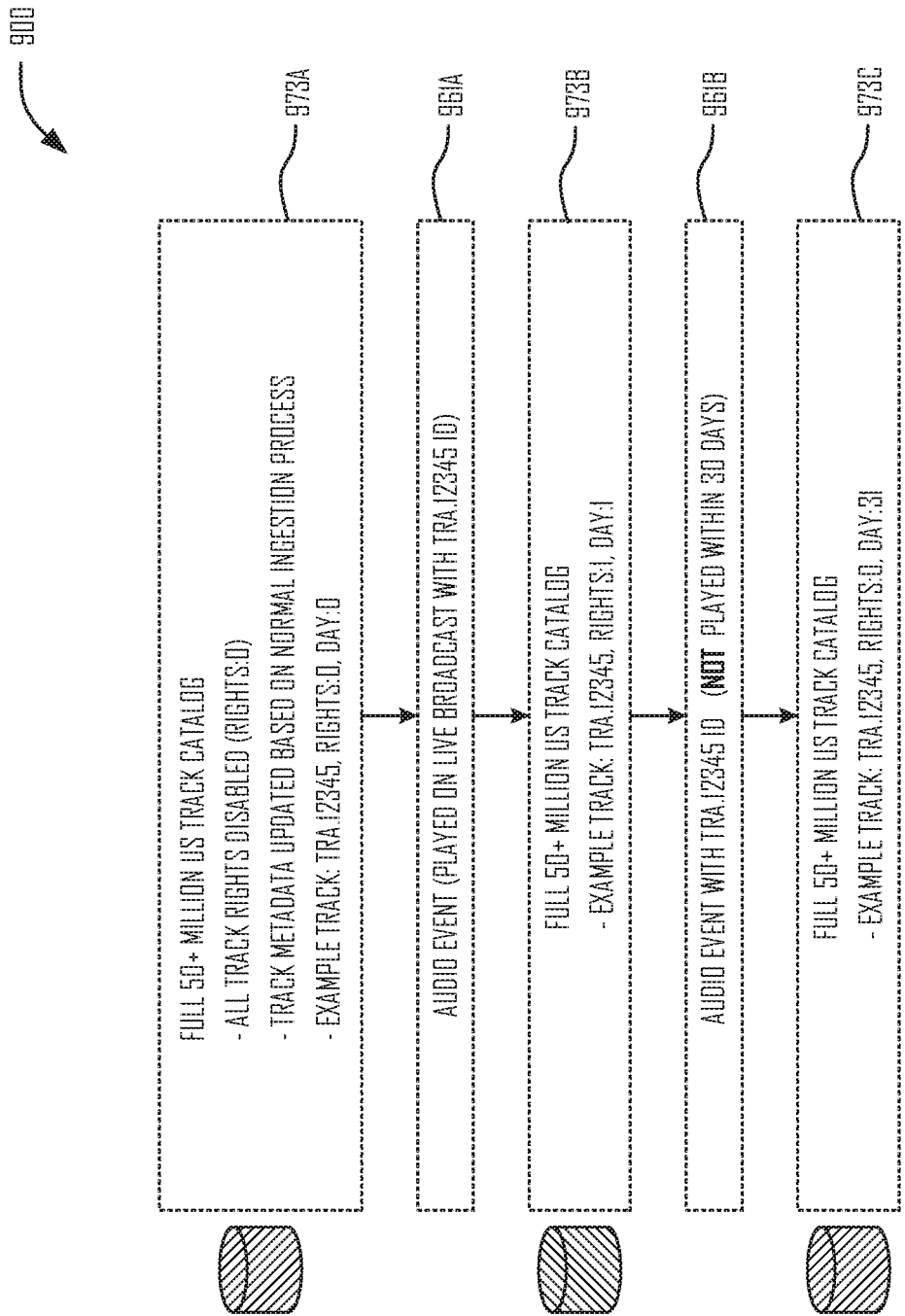
FIG. 9 depicts how an improved protocol for programming and tracking may be implemented according to one or more improved technologies described herein.

In some variants one or more music catalog dynamic creation modules 373 may determine particular content (e.g. a specific set of tracks) that will be available as part of a music on-demand catalog (see FIGS. 7-9). The Napster® Interactive Radio Service will continually pull music events from participating hosts 201 or stations 210 and building a set of tracks available for on-demand playback in association with that content provider 310.

In some variants one or more creation tool and playlist conversion modules 374 may (optionally) be configured to keep a linear setlist of the items in the order in which they are broadcast from the station while the Napster® Interactive Radio Service is monitoring station events and passing these events to the Napster® Platform. This allows the service to regenerate the original broadcast via on-demand content 767. (In some variants such regeneration does not include advertisements unless added by the client application.)

In some variants, such a setlist may be its own sui generis object type organized in a chronological sequence 1480, optionally with one setlist/sequence 1480 per station (see FIGS. 11-14). An API 1190 as described below may be configured to request any events within a specific time range or within a recent period (e.g. a number X of days before a current time, wherein X is on the order of 5-10). Such sequences may (optionally) be broken into day parts, thus having multiple setlists per station 210. This way, a sequence may in some variants be broken down to include the shows from the day part (the morning, afternoon, evening or nighttime, e.g.) shows for a specific station. By default, a setlist may include one day's worth of programming for a specific station. In some variants, an item of content that spans a day transition may be included in the setlist for both the prior and current day.

In some variants one or more content recommendation modules 376 may be configured to suggest content objects based on other content objects in the service. One example of this is to request a list of tracks that are based on a single or multiple seeded track list (an on-demand radio station, e.g.). This system may be extended to not only deliver music based track recommendations, but also be able to suggest non-music objects for other objects within the system. In a lookup operation that identifies a particular host 201, for example, an API operation may look up a host personality of a like genre. Or, for a given host talk show event, other talk show events of a like genre may be returned. The Napster® Platform Recommendation Engine is robust enough to be able to suggest non-music related events and content. Given play and genre/tag information, it may be extended to handle non-music content events as described herein.

In some variants one or more content mapping modules 384 may be configured to relate auditory and other content as described with reference to music catalog dynamic creation modules 373 to a particular station 210 or other provider 310 by which it was generated. See FIGS. 4-11. Such content may in some variants include host talk sessions, live user call in sessions, pre/post roll audio, buffer audio, and other such content items. The metadata 1175 for such events may be saved in the Napster® Catalog Database and may be referenced as needed when an on-demand session is started. Audio for such events may be saved and played back as part of the audio queue. Alternatively or additionally, syndicated events may be defined such that multiple stations 210 are all associated with a single content event. See FIGS. 5-8. This can occur, for example, in a context in which effective content deduplication could not otherwise occur without a significantly reduced access to popular content items.

In some variants one or more subscription entitlement management and billing modules 386 may be configured to create user objects that identify and distinguish individual or corporate users 150 and add/remove subscription services to such user objects. A Napster® User Account Creation and Provisioning API service may (optionally) be extended to create users 150 for specific radio stations or for station groups.

In some variants one or more content presentation API modules 390 may include an API that refers to radio station and service objects. Such content items are described further, for example, below in regard to FIG. 11. Alternatively or additionally, such modules 384 may include one or more instances of user authentication modules, of metadata API modules, of public member API modules, of authenticated member API modules, of playback API modules, or of images service modules. Napster® publishes descriptions for such API's online.

In some variants one or more user application and presentation modules 392 may update its API to include new functionality to augment the live linear program with on-demand events. A sample of changes to the API may be found in the Sample API Definition section below. This can occur, for example, in a context in which one or more stations 210 will maintain control of the development and delivery of any client that is used to render a live stream 272A, play on-demand content 767 segments and display metadata information for the user experience presentation.

Napster® may also provide a set of Java static Software Development Kits (SDKs) or other libraries of modules that may be compiled directly into a station client application. Such libraries are expected to make it easier for the station application development team to integration and reuse the logic for switching between live and on-demand streams/events, determining content to play during on-demand segments, provide feedback and metering information for on-demand content 767, implement usage and royalty reporting, and various other functions like those described with reference to FIG. 3. Since playback may optionally use multiple different third party provided renderers and SDKs, Napster® may elect not provide an SDK for playback. In some variant systems 300 all media content may be utilized directly through the Napster® Client API. Napster® may provide assistance in any playback integration to ensure the application is switching between the renderers appropriately and that content metering is being implemented correctly against Napster® guidelines.

In some variants one or more ad insertion modules 393 (e.g. resident in program capture device 271 or servers described below) may be configured to allow the station 210 to insert an audio advertisement into the queue of events to be played at any time during the playback of on-demand content 767 events. The ad user experience may in some variants include a large visual banner (e.g. occupying more than 30% of a screen image 1911) that is displayed in conjunction with audio content playback events. See FIGS. 4-8 and 19.

In order to do this, it is expected that many ad service companies may provide their own SDKs with playback rendering logic, entry points for ad selection and metering. In order to accommodate this, the application may optionally be able to switch between playback mechanisms in the code based on the source of the object's stream being rendered.

In some variants one or more on-demand content 767 delivery modules 394 may be configured to perform the request and retrieval of event media stream locations, media feedback (i.e. "like," "dislike," "favorite," "unfavorite," etc.) and playback event metering notifications at the time of start and stop of content. Napster® publishes descriptions for such "playback" modules that may (optionally) be extended to handle the new content items as presented herein.

In some variants one or more content royalties and reporting modules 396 may be configured to provide such services of the Napster® Platform, depending on the reporting requirements for the partnerships involved as well as any label or publishing association needs. Changes to the platform may include playback, station and host, physical location of reception and client usage analytic data.

In some variants one or more business intelligence and analytics modules 398 may be configured to provide such services to of the Napster® Platform, depending on the internal and external requirements for the partnerships involved as well as any label or publishing association needs. Changes to the platform may include playback, station and host, physical location of reception and client usage analytic data.

FIG. 4 depicts a system 400 showing how one or more stations 210 may interact with a proprietary Napster® platform. One or more client applications 414 (e.g. in a client device 1200A like that of FIG. 12 or other implementation of a program capture device 271) may comprise one or more instances of on-demand software development kits (SDKs) 416, of operating system media players 417, or of ad player SDKs 418 as shown. As described herein one or more Napster® APIs 490 may interact, for example, with modules of an on-demand SDK 416 and an operating system media player 417 so as to combine a live stream 272C with one or more on-demand files 467A into a hybrid presentation 289 unique to a particular client device or user 150. Moreover in some variants one or more station APIs 470 may likewise interact with an ad player SDK 418 that handles ad streams and images 467B that form a part of such hybrid presentation 289 unique to a particular client device or user 150.

This can occur, for example, when a live stream 272A-C provided by a local station 210 has up-to-the-minute content of local interest to the user 150 but in a manner that warrants adjustments to the live stream as described herein. In some variants a radio station 210 may (optionally) insert an audio advertisement into the queue of events to be played at any time during the playback of on-demand content 767 events. The ad user experience may in some variants also have a visual banner or fullscreen overlay that is associated with the audio. In order to do this, many Ad Service Companies may provide their own SDK with playback rendering logic, entry points for ad selection and metering. In order to accommodate this, the application may be able to switch between playback mechanisms in the code based on the source of the object's stream being rendered into the presentation 289.

FIG. 5 depicts an on-demand segment in which one or more improved technologies (relative to a current state of the art) may be implemented. For a limited interval of a simulcast or other "live stream" time (e.g. of 3-6 minutes) in which suboptimal content (e.g. according to a profile of user 150) is being presented or is predicted to be presented, a particular on-demand segment sequence 500 of several on-demand events 561A-D is exemplified. An interjection of an on-demand sequence 500 like this may be routed to or within a client device 1200 so as to interrupt (or in some cases prevent) a presentation of such suboptimal content. In some contexts related streaming content (e.g. having the same category identifier but from a different local station 210C) may then become part of the live stream 272 or the interrupted live stream may then be resumed, in real time, according to respective embodiments as further described below.

FIG. 6 depicts a data handling platform 600 in which one or more improved technologies may be implemented to process metadata associated with radio events. A station 610 transmits one or more programs 665 or other audio content (e.g. music, host talk sessions, live listener call in sessions, pre/post roll audio, and buffer audio) is processed by a program capture device 671 and routed as respective MP3 files 667A-D to temporary storage 618. A Napster® Interactive Radio platform module 668 subsequently performs ingestion then transmits resulting metadata and other digital content to a Content Data Network (CDN) as described herein.

A program capture device 271, 671 as described herein (e.g. at a station 210 or other content source 310) may be configured to perform live media content capture so as to ensure that resulting content is suitable to be replayed as one or more on-demand segments 561. The content may initially be captured, for example, as raw Pulse Code Modulation (PCM) audio. The program capture device 271, 671 may then encode the content to mp3 and upload it to a temporary storage location.

The Napster® Ingestion Service may scan this temporary storage location for new files added at periodic intervals. When new content is found, it may be ingested into the Napster® Catalog for the region where the station is broadcasted from. The content may be published and available within minutes of the end of the original broadcasted event. For example, if the station is KZOK in Seattle the content may be ingested into the Napster® catalog for the United States. Napster® may re-encode the content to support additional audio formats in order to support devices and applications that do not support mp3. This content may be available in the same way that content is ingested from the music labels for audio content.

FIG. 7 depicts another data handling system 700 in which one or more improved technologies may be implemented. As part of an ingestion process, one or more processing modules 770 thereof may evaluate content 767 coming in and associate tags or other metadata 775 with one or more events/segments thereof. The ingestion protocols may in some variants generate or otherwise extract audio fingerprinting 771 for music identity, audio waveform analysis 773 (e.g. a measurement of musical beats per minute or similar tempo indication 774, audio normalization peak information 776, or frequency power spectrum information 777), a mood/genre classification 778, audio to text transcription 779, or some combination of these. This information may be saved as part of the event content metadata in the Napster® catalog and later be used to associate tags with the event object.

For audio to text transcription, common fill words (i.e. "a", "and", "if", "the", "or", "when", "then", etc) may be removed and dynamically generated tags may be generated off of the remaining words. Capitalized words within sentences may automatically be combined for these tags. I.e. "Seattle Mariners" may be saved into 3 separate tags, "Seattle", "Mariners" and "Seattle Mariners."

Tag examples may in some variants include (1) beats per minute between 140 and 160 bpm=>"Running", "Workout", "Fitness", "155 bpm"; (2) "Seahawks" found as part of audio to text transcription=>"Seahawks"; (3) in text transcription, 'When we created Microsoft, said Bill Gates, we . . . '=>"Microsoft", "Bill", "Gates", "Bill Gates", "created"; (4) the host name of the program event=>"Howard Stern"; or (5) a call sign or other identifier of a particular radio station 210=>"KZOK", "FM", "KZOK FM." These tags may be stored in Napster® Platform content catalog for the region of the station. Search functionality may be able to quickly find content with specific keywords. This content may then be played as part of on-demand segments of the radio stream.

FIG. 8 depicts a schematic illustration 800 of a partial substitution of one or more on-demand segment into a live stream 272 according to one or more technologies described herein. A conventional broadcast or other live stream 272 comprises a talk show event 861A, one or more ads 861B-D, and a buffer event 861E resembling those of FIG. 10. A control activation or similar user action triggers and manifests a start of an on-demand transition event 861F and a request for on-demand content 767 event 861G which may (optionally) both occur instantaneously. This in turn triggers one or more on-demand music or related events 861H, optionally including one or more notifications 881 as further described below. After an appropriate hybrid performance 289 and after any apparently unwanted events 861 and snippets 865 are complete, a fade or other transition back to live event 861I is implemented as shown.

In the context of illustration 800, a listener or other user 150 may be able to be listening to a live stream 272 and then shift into a set of on-demand content 767 767 at any point (e.g. as an instantaneous response to an action by user 150). There are parts of the program that a listener is less interested in. When this is the case, the listener may shift into an on-demand segment until the live stream 272 returns to something of interest or until another live stream 272 is selected.

By looking at the device feed coming from the station, the Napster® Interactive Radio Service may have the ability to know the current and some of the upcoming event(s). By looking at the event metadata such as duration and type, the service may fill one or more unwanted portions of the live stream 272 with one or more on-demand events 861 in an on-demand segment sequence 500 or other queue 873.

The listener, through the use of controls and other actions that manifest user preference, may (directly or otherwise) select the type of fill content they are interested in. See FIG. 19. In the case where a user 150 is more interested in hearing music, when live ad segments are coming up on the broadcast, the Napster® Interactive Radio Service may add the duration of the upcoming live ad events and replace them with a number of service recommended music on-demand events FIG. 9 depicts how an improved protocol for programming and tracking may be implemented according to one or more technologies described herein so as to facilitate greater control in digital rights management. In order to determine a specific set of tracks that may be available as part of an music on-demand catalog 973A-C, an Interactive Radio Service 900 may be configured to pull content events from a given station 210 and building a set of tracks available for on-demand playback for that station 210. The a priori catalog 973A may start with all available content for the region set to no rights (rights=0). The rights for a specific track may be enabled at a time when the track is played (e.g. as event 961A) as part of a live stream 272. After 30 days, the rights for the given track may be disabled (e.g. as event 961B) if the track was not played again on the live stream.

If a station 210 is playing back events in linear order and is based on time-of-day programming, we may calculate an estimated maximum and median catalog size. Given an average track length of 4 minutes and the total number of minutes in a 30 day period is 43,200 minutes, the average maximum number of tracks in a catalog for a station may be about 10,800 tracks. Assuming that at least 40% of the linear programming is non-music, the average median number of tracks in a given music station's catalog may be about 6,480. We may also optionally account for this being a unique set of tracks. Depending on the frequency of the same songs being played, it's likely that this number may in some variants be considerably lower.

A user 150 may be presented all of the (content segments or other) content 767 that the station 210 has been playing over the course of 30 days. Once a track/segment is played, it may be included in the available catalog set. This may allow the user to favorite the track and keep it in their library. If a user has saved a track to their library and that track has lost rights, the user may (in some variants) still see the track in an unavailable state. Interacting with the track may present the user with an upsell to the full on-demand tier of the Napster® powered service.

In addition to music related content as described with reference to the one or more music catalog dynamic creation modules 373, in some variants a Napster® Interactive Radio Service may also be pulling in non-music related content and mapping it to one or more stations 210 that generated the content. In some contexts many stations may be associated with a single piece of content 767, for example, to save storage space. This content may in some variants include items such as host talk sessions, live listener call-in sessions, pre/post roll audio and buffer audio. The metadata for these events may be saved in a database that implements the catalog 973 and may be referenced as needed when an on-demand session is started. Audio for these events may be saved and played back as part of the audio queue.

Figure 10:
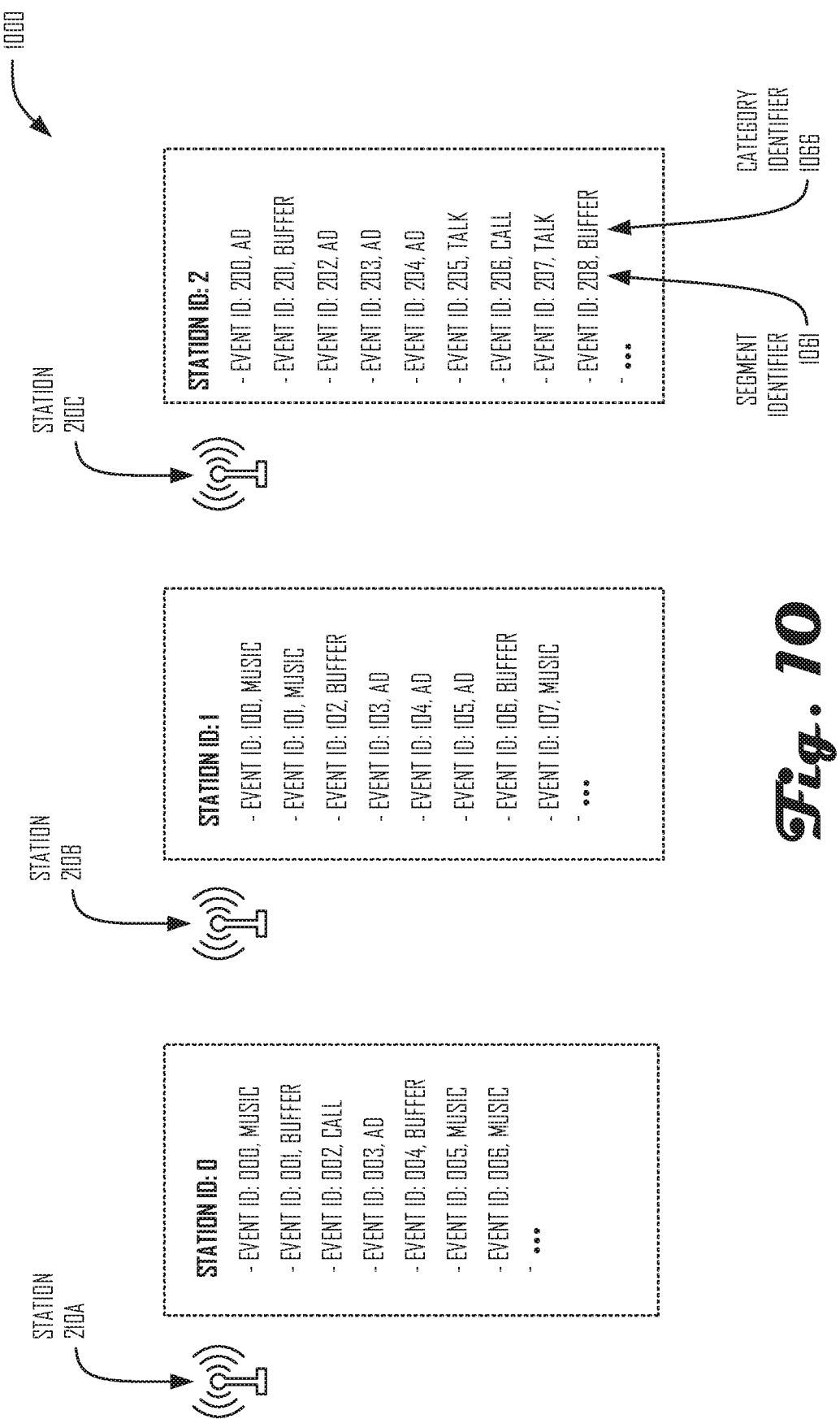
FIG. 10 depicts how coordinated content programming or tracking may be implemented according to one or more improved technologies described herein.

FIG. 10 depicts how coordinated content programming or tracking may be implemented according to one or more technologies described herein. Multiple stations 210A-C each able to broadcast or otherwise transmit a live stream 272 to a user 150. Each station 210A-C keeps a three-digit segment identifier 1061 and corresponding metadata including "MUSIC," "BUFFER," "CALL," "AD," "TALK," or other such alphanumeric category identifiers 1056.

Figure 11:
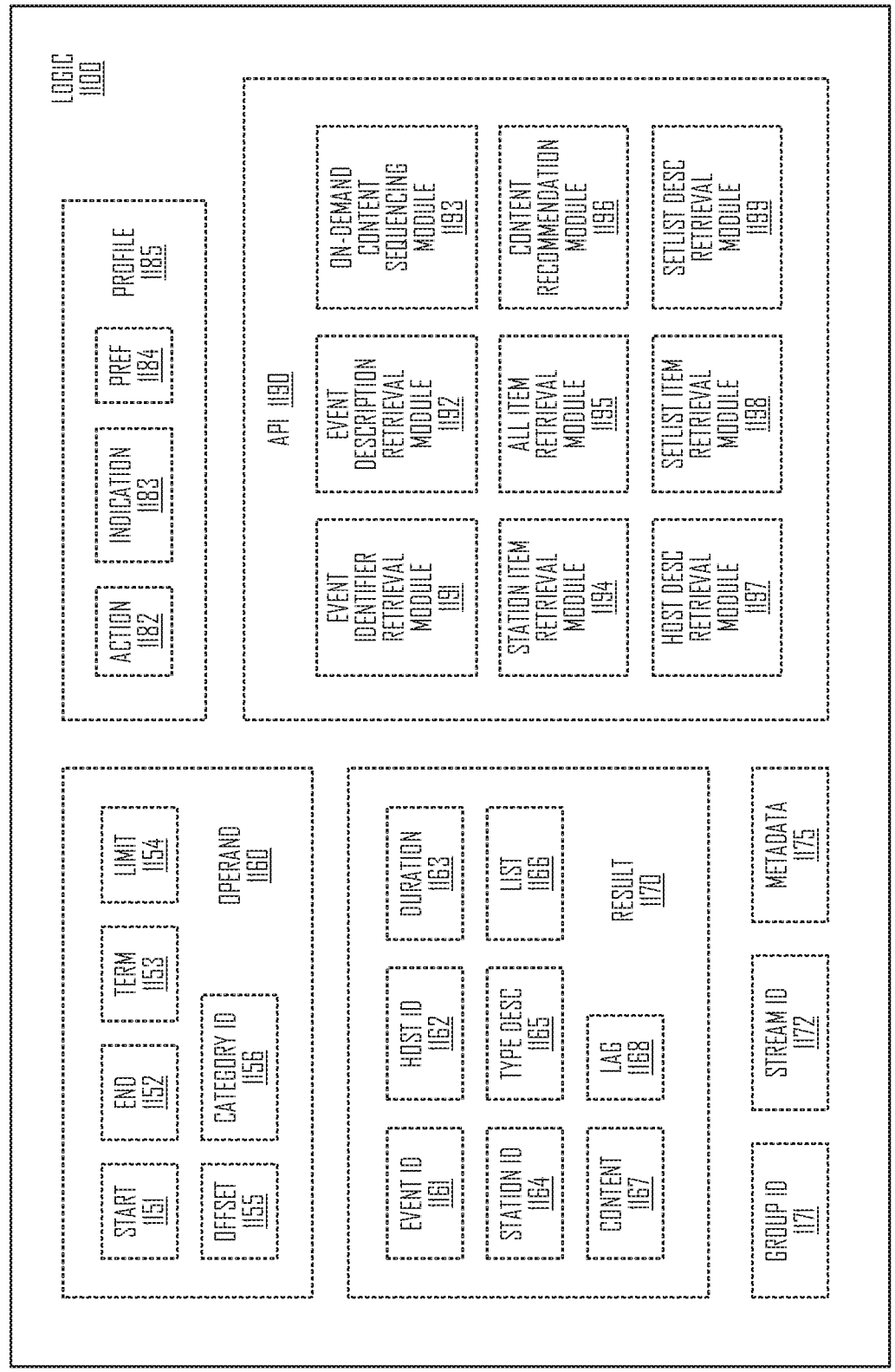
FIG. 11 depicts distributed or other transistor-based event-sequencing logic including one or more instances of operands, results, or other API components according to one or more improved technologies described herein.

FIG. 11 depicts distributed or other transistor-based event-sequencing logic 1100 including one or more instances of operands 1160, of results 1170, of group identifiers 1171, of stream identifiers 1172, or of other metadata 1175. For example one or more modules of an API 1190 may (optionally) require or otherwise act upon one or more instances of event or process starts 1151 and ends 1152, of terms 1153, of limits 1154, of offsets 1155, of category identifiers 1156, or other such operands 1160 (or combinations thereof). Likewise one or more modules of an API 1190 may, for example, generate or otherwise handle one or more instances of event identifiers 1161, of host identifiers 1162, of durations 1163, of station identifiers 1164, of type descriptions 1165, of lists 1166, of content 1167, of lags 1168, or of other such results 1170 (or combinations thereof). Such APIs 1190 may also act upon one or more instances of actions 1182, of indications 1183, or of other predicted or actual user preferences 1184 in a profile 1185 of each given user 150 or group of users.

In some contexts, for example, such logic 1100 may include one or more instances of event identifier retrieval modules 1191 (e.g. configured to return a list event identifiers 1161 associated with a station identifier 1164). Such logic 1100 may likewise include one or more instances of event description modules 1192 (e.g. configured to return a detailed information about an event or events, including station, host, duration and type information). Such logic 1100 may likewise include one or more instances of on-demand context sequencing modules 1193 (e.g. configured to return a list 1166 of events to play when a user switches to an on-demand segment based on one or more dates, durations, or user authentication information). Such logic 1100 may likewise include one or more instances of station item retrieval modules 1194 (e.g. configured to return a list 1166 of host identifiers 1162 associated with a station identifier 1164, optionally accepting a limit 1154 and offset 1155 to obtain a range of results 1170). Such logic 1100 may likewise include one or more instances of all item retrieval modules 1195 (e.g. configured to return a list 1166 of all host items in a catalog 973, optionally accepting a limit 1154 and offset 1155 to obtain a range of results 1170). Such logic 1100 may likewise include one or more instances of content recommendation modules 1196 (e.g. configured to return a list 1166 of recommended event or station items in a catalog 973, optionally accepting a limit 1154 and offset 1155 to obtain a range of results 1170). Such logic 1100 may likewise include one or more instances of host description retrieval modules 1197 (e.g. configured to return detailed information about one or more hosts 201, including station identifiers 1164 each host is associated with, times the host is live and genre information about the content of the host's show). Such logic 1100 may likewise include one or more instances of setlist item retrieval modules 1198 (e.g. configured to return a list 1166 of setlist items associated with a station identifier 1164, optionally accepting a start 1151, end 1152, limit 1154, offset 1155, or a combination of these to obtain a range of results 1170). Such logic 1100 may likewise include one or more instances of setlist description retrieval modules 1199 (e.g. configured to return detailed information about a setlist, including events for that list 1166 of one or more items) or of other API or SDK modules as described herein.

Referring again to the above-described FIGS. 1-11, a scenario is envisioned in which a user 150 is initially listening to a live stream 272, 472 being broadcast by a particular station 210B that allows a metadata capture module 342 to receive categorical first metadata 1175 in advance of broadcast. Such metadata 1175 (e.g. including a category identifier 1156 of "AD") pertains to a plurality of upcoming disfavored segments (e.g. broadcast advertising events 861 having segment identifiers 1061 of 103-105 as shown) of the live stream having a total estimated duration longer than 5 minutes. This can occur, for example, in a context in which numerous advertisers with tailored content are much more interested in access to that particular user 150 (e.g. based on demographics and not merely location), in which a presentation 289 of indiscriminate broadcast ads is therefore not the best use of the attention of that user 150, and in which the user 150 is not known to have taken actions 1182 signifying a necessity of avoiding all advertising content (such as an indication 1183 that the user 150 has paid a premium for ad-free content delivery). In a context like this, a hybrid presentation 289 can be served such that one or more upcoming broadcast segments are omitted and one or more suitable on-demand segments (e.g. several on-demand events 561 in an interjected on-demand segment sequence 500) at least as long as the omitted broadcast segments. If the interjected on-demand segment sequence 500 is longer in duration than the one or more omitted broadcast segments, a content-insertion-induced lag 1168 may be created upon resumption of the live stream 272, 472. Methods for reducing such lags 1168 gracefully are presented herein, and others will be apparent to those skilled in the art in light of teachings herein.

Figure 12:
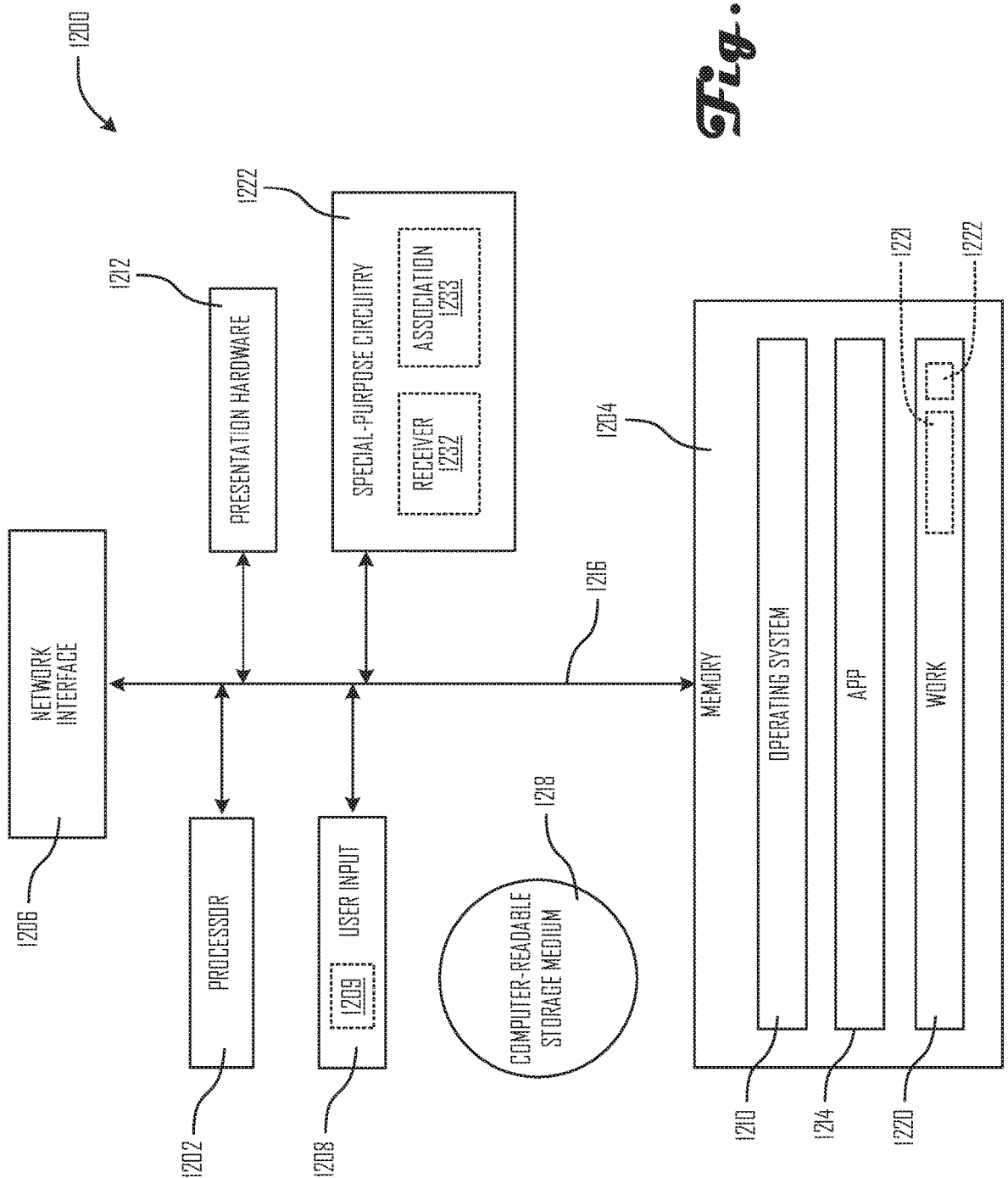
FIG. 12 schematically illustrates a client mobile device in which one or more improved technologies may be incorporated.

Referring now to FIG. 12, there is shown a client mobile device 1200 in which one or more technologies may be implemented. Device 1200 may include one or more instances of processors 1202, of memories 1204, user inputs 1208 receiving various indications 1209, and of (speakers or other) presentation hardware 1212 all interconnected along with the network interface 1206 via a bus 1216. One or more network interfaces 1206 allow device 1200 to connect via the Internet or other networks 190). Memory 1204 generally comprises a random access memory ("RAM"), a read only memory ("ROM"), and a permanent mass storage device, such as a disk drive.

Memory 1204 may contain one or more instances of operating systems 1210, of web browsers or other local apps 1214, and many playable works 1220 (e.g., comprising "high definition" playable data 1221 or standard-quality playable data 1222). These and other software components may be loaded from a non-transitory computer readable storage medium 1218 into memory 1204 of the client device 1200 using a drive mechanism (not shown) associated with a non-transitory computer readable storage medium 1218, such as a floppy disc, tape, DVD/CD-ROM drive, flash card, memory card, or the like. In some embodiments, software components may also be loaded via the network interface 1206, rather than via a computer readable storage medium 1218. Special-purpose circuitry 1222 (implemented on a Subscriber Identity Module card or other removable apparatus, e.g.) may, in some variants, include some or all of the event-sequencing logic described below (e.g. in a peer-to-peer implementation) as well as one or more instances of receivers 1232 or of digital associations 1233. In some embodiments client device 1200 may include many more components than those shown in FIG. 12, but it is not necessary that all conventional components of a mobile device be shown in order to disclose an illustrative embodiment.

Referring again to the above-described FIGS. 1-12, a system 100, 300, 400, 700 is envisioned in which first transistor-based circuitry 1222 aboard a mobile device 1200 obtains categorical first metadata 1175 pertaining to one or more programmed segments (e.g. as one or more events 861) of a first live stream 272, 472 during a local presentation 289 of the first live stream 272, 472, wherein the categorical first metadata 1175 includes a category identifier 1066 pertaining to the one or more programmed segments including a first programmed segment (e.g. as event 861A) that includes (at least) a first snippet 865 (exactly or otherwise) at a concluding portion of a content item currently being presented. Second transistor-based circuitry 1222 aboard the mobile device 1200 obtains an indication 1209 of (an activation of) a first user control (see FIG. 19) signaling a user request 861G for on-demand content 1167. Third transistor-based circuitry 1222 aboard the mobile device 1200 obtains a selection (e.g. manifested as an action 1182) of at least a first on-demand content item partly based on a transitional first notification 881 and partly based on a resumptive second notification 881. Fourth transistor-based circuitry 1222 aboard the mobile device 1200 conditionally causes an interruption of the first live stream 272, 472 by inserting both the transitional first notification 881 and the first on-demand content item (e.g. an on-demand file 467 or other playable content 767, 1167 as an inserted on-demand event 561) so as to displace at least some of the first programmed segment as a conditional response to one or more indications 1183 of a first (implicit or other) user preference 1184 pertaining to the first on-demand content item over a second user preference 1184 pertaining to the first programmed segment partly based on the first and second user preferences 1184 and partly based on a category identifier 1066 pertaining to the later-programmed second programmed segment (e.g. as event 861E), wherein the first user preference 1184 is manifested as an activation of the first user control signaling a user request 861G for immediate on-demand content 1167. Fifth transistor-based circuitry 1222 aboard the mobile device 1200 automatically and conditionally causes a resumption of the first live stream 272, 472 by causing a presentation 289 of a resumptive second notification 881 and then the later-programmed second programmed segment after a local presentation 289 of the first on-demand content item, wherein a local presentation 289 of (at least) the first snippet 865 at the concluding portion of the content item is thereby omitted from the local presentation 289 of the first live stream 272, 472. Sixth transistor-based circuitry 1222 aboard the mobile device 1200 automatically and conditionally reduces a lag 1168 in the first live stream 272, 472 by omitting at least a later-programmed third programmed segment.

Figure 13:
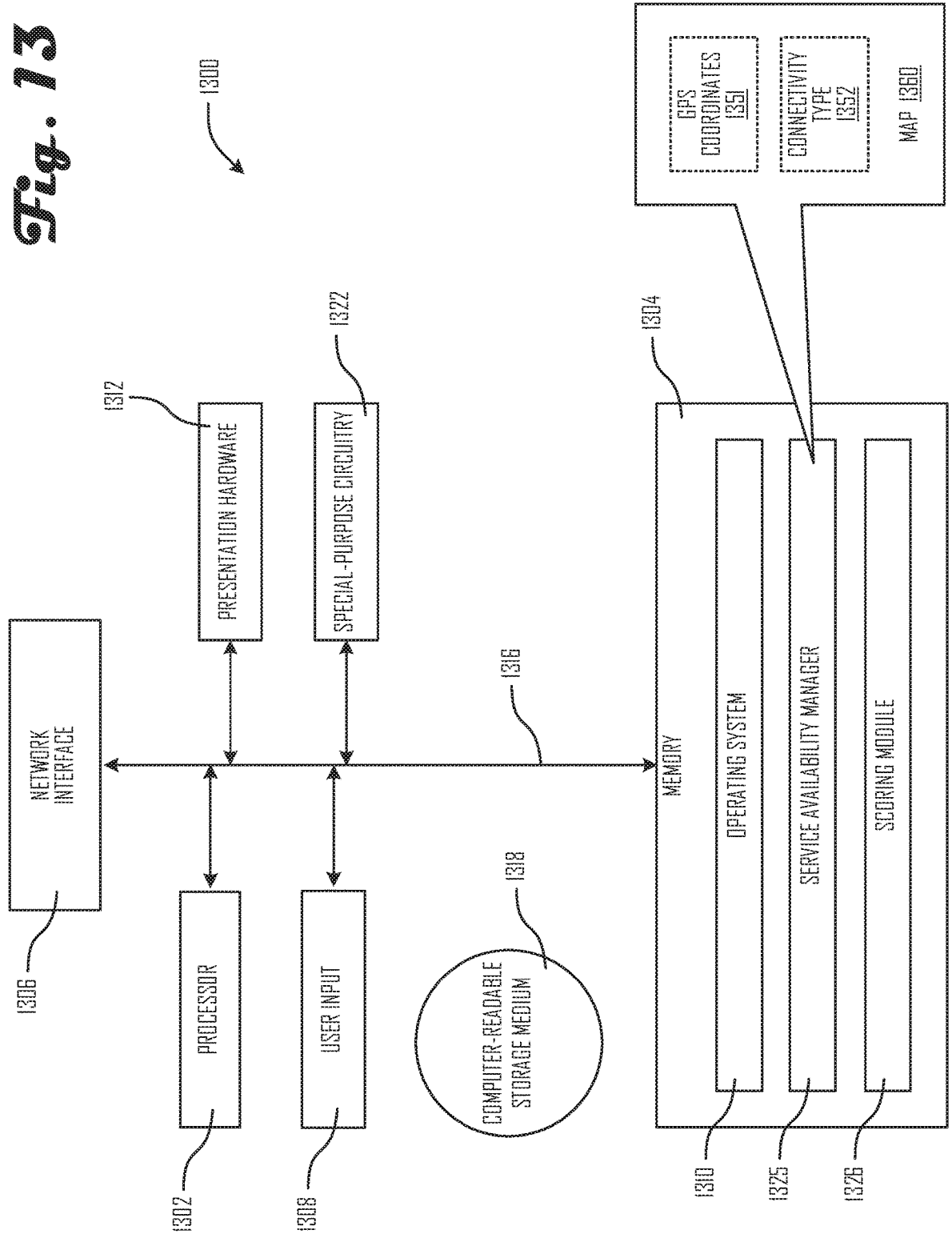
FIG. 13 schematically illustrates a server in which one or more improved technologies may be incorporated.

Referring now to FIG. 13, there is shown a server 1300 in which one or more technologies may be implemented. Device 1300 may include one or more instances of processors 1302, of memories 1304, user inputs 1308, and of (speakers or other) presentation hardware 1312 all interconnected along with the network interface 1306 via a bus 1316. One or more network interfaces 1306 allow device 1300 to connect via the Internet or other networks 190). Memory 1304 generally comprises a random access memory ("RAM"), a read only memory ("ROM"), and a permanent mass storage device, such as a disk drive.

Memory 1304 may contain one or more instances of operating systems 1310, of service availability managers 1325, or of media preference affinity services or other such scoring modules 1326 that facilitate modeling the preferences of each user 150. These and other software components may be loaded from a non-transitory computer readable storage medium 1318 into memory 1304 of the client device 1300 using a drive mechanism (not shown) associated with a non-transitory computer readable storage medium 1318, such as a floppy disc, tape, DVD/CD-ROM drive, flash card, memory card, or the like. In some variants a service availability manager 1325 may include a detailed map 1360 associating each set of Global Positioning System (GPS) coordinates 1351 with a corresponding wireless connectivity type 1352 (e.g. identifying what types of signals 195 are putatively available at the corresponding location). In some embodiments, software or other digital components may also be loaded via the network interface 1306, rather than via a computer readable storage medium 1318. Special-purpose circuitry 1322 (implementing a co-processor, e.g.) may, in some variants, include some or all of the event-sequencing logic described below. In some embodiments client device 1300 may include many more components than those shown in FIG. 13, but it is not necessary that all conventional components of a mobile device be shown in order to disclose an illustrative embodiment.

Figure 14:
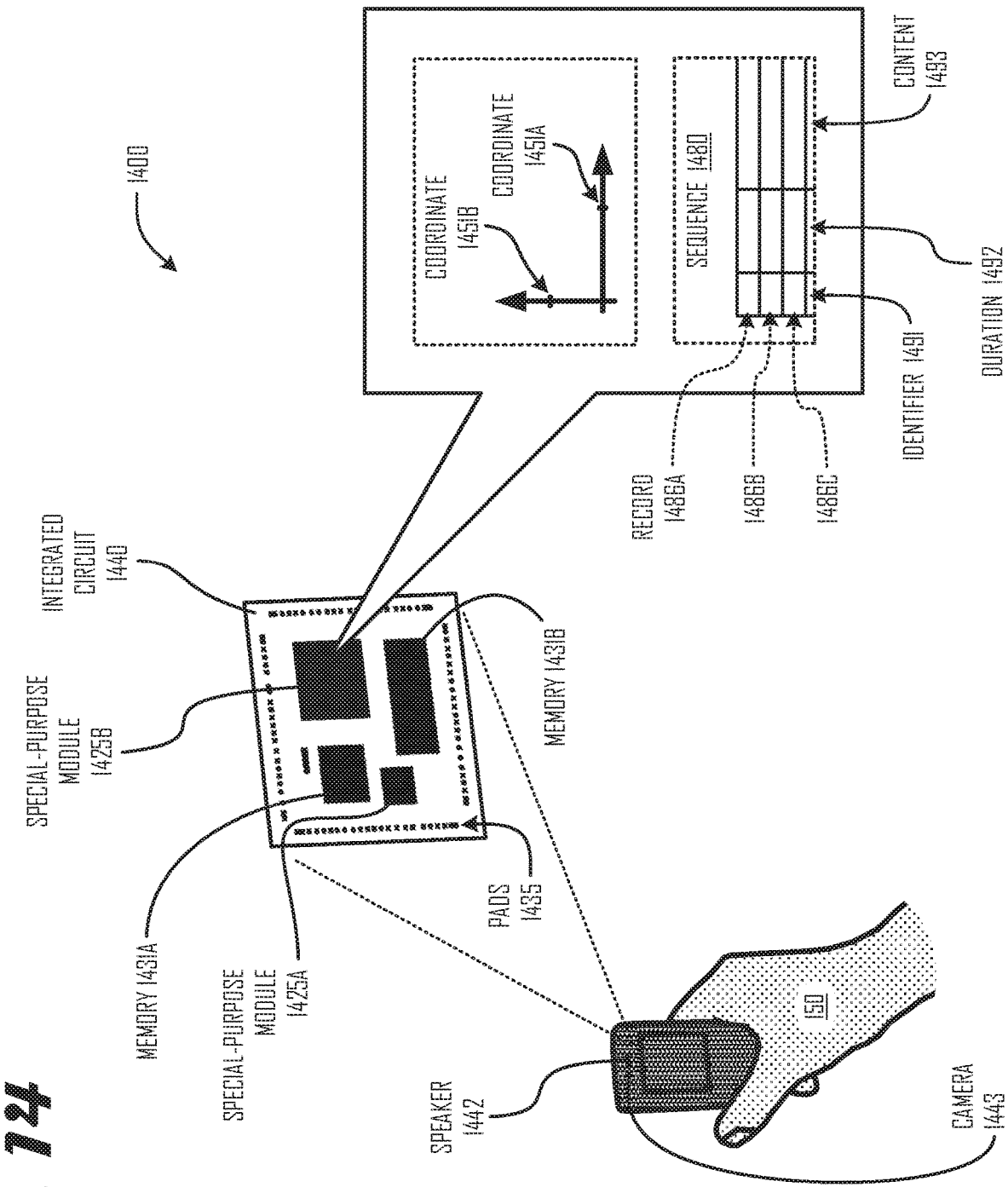
FIG. 14 illustrates a handheld mobile device in which one or more improved technologies may be incorporated.

Referring now to FIG. 14, there is shown a handheld device 1400 in which one or more technologies may be implemented (e.g. as an instance of mobile device 1200). Device 1400 comprises one or more instances of speakers 1442, of cameras 1443, of touchscreens, or of other displays. Also within device 1400 as shown is at least an integrated circuit 1440 including one or more instances special-purpose modules 1425A-B (comprising a GPS receiver or other hard-wired special-purpose circuitry as described below, e.g.); and different structures of memories 1431A-B interlinked by numerous signal-bearing conduits and otherwise configured as described below. A few of the electrical nodes thereof (comprising pads 1435 along the sides as shown, e.g.) provide external connectivity (for power or ground or input signals or output signals, e.g.) via bonding wires, not shown. Significant blocks of circuitry thereon may allow a reliable determination of the GPS coordinates 1451A-B of the handheld device 1400 when able to detect satellites 191 or an efficient capacity for downloading or otherwise acquiring suitable works 1220 for arrangement in a content sequence comprising a series of records 1486A-C each having an identifier 1491, a duration 1492, and (at least a location of) content 1493 of each playable work.

Figure 15:
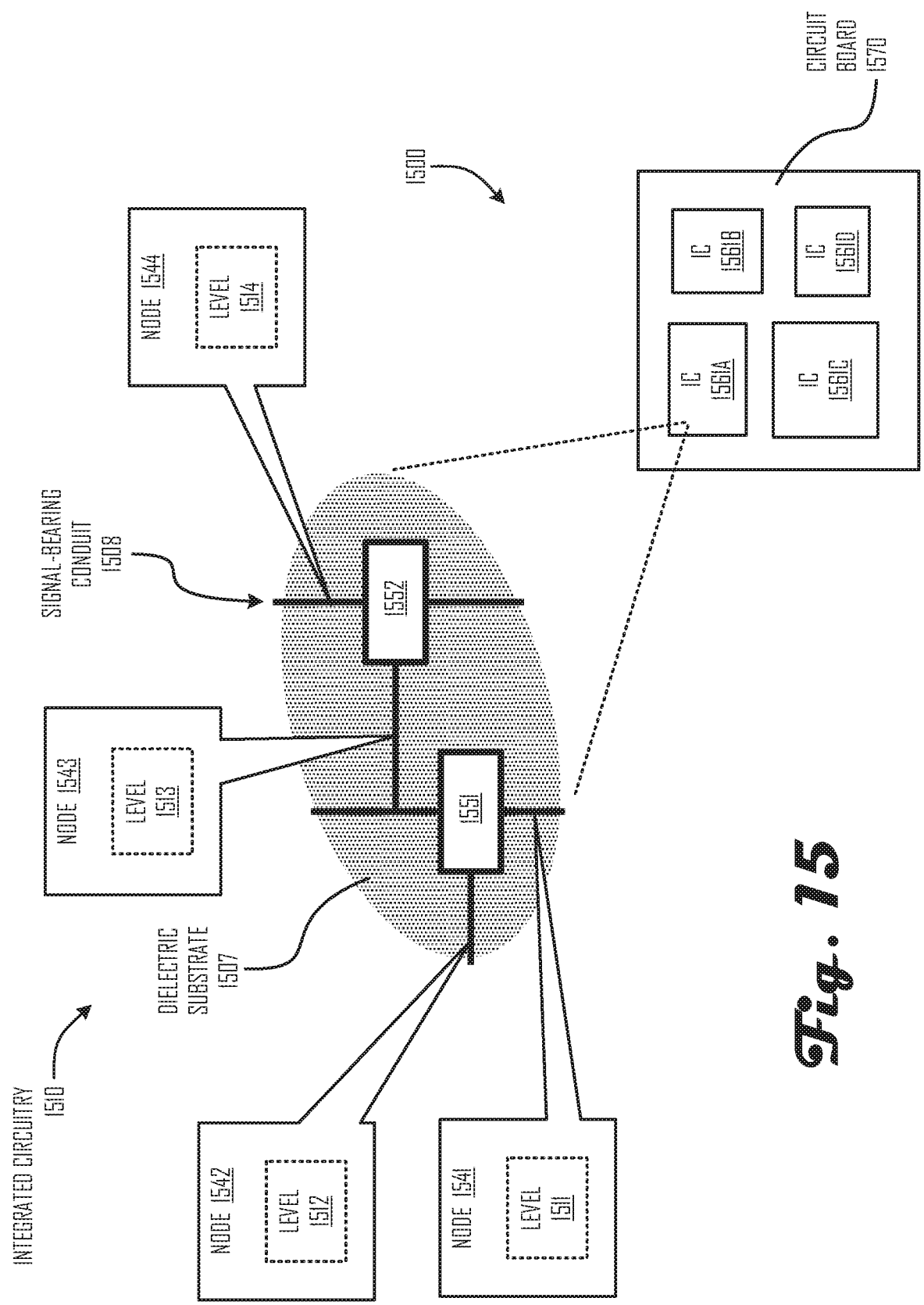
FIG. 15 illustrates transistor-based circuitry in which one or more improved technologies may be incorporated.

With reference now to FIG. 15, shown is transistor-based circuitry 1500 in which one or more technologies may be implemented in a system 100, 300, 400, 700, 1400 as described above. A circuit board 1570 includes several integrated circuits (ICs) 1561A-D. Integrated circuitry 1510 within IC 1561A, for example, includes transistors 1551, 1552 each formed onto a single dielectric substrate 1507. Transistor 1551, for example, comprises a control terminal (a gate or base, e.g.) at node 1542 and two end terminals (at nodes 1541, 1543) as shown. Such formation may be achieved by a series of several lithographic processes (chemical and thermal and optical treatments for applying and treating and etching dielectrics or dopants or other materials, e.g.). Many millions of such transistors 1551, 1552 are linked in a network of signal-bearing conduits 1508 (forked or other serpentine signal traces, e.g.) according to intricate circuit designs formed of circuit blocks (initiation modules and response modules like those described with reference to FIG. 16, e.g.) of a same general type as those described herein. Even among the relatively complex circuit blocks presented herein in context, however, many such blocks (excluding a variety of components such as an antenna, e.g.) are linked by electrical nodes 1541, 1542, 1543, 1544 each having a corresponding nominal voltage level 1511, 1512, 1513, 1514 that is spatially uniform generally throughout the node (within a device or local system as described herein, e.g.). Such nodes (lines on an integrated circuit or circuit board 1570, e.g.) may each comprise a forked or other signal path (adjacent one or more transistors 1551, 1552, e.g.). Moreover many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol.

Figure 16:
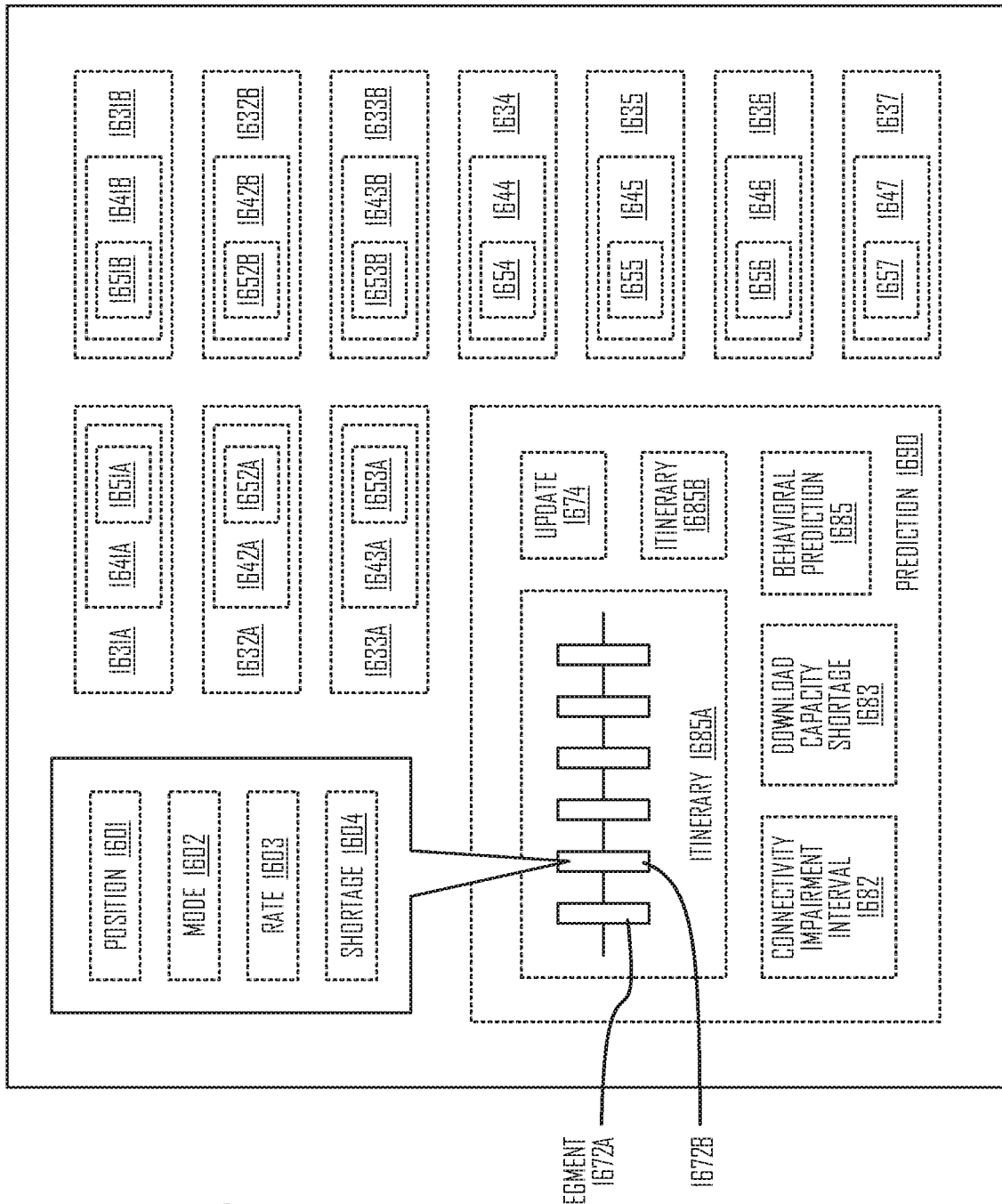
FIG. 16 schematically illustrates additional transistor-based circuitry in which one or more improved technologies may be incorporated.

Referring now to FIG. 16, there is shown event-sequencing transistor-based circuitry 1600 in which one or more technologies may be implemented, optionally as an Application-Specific Integrated Circuit (ASIC) or custom circuit board 1570. A series of itineraries 1685A-B is shown in which each comprises a series of segments 1672A-B. Each segment 1672 may comprise one or more instances of positions 1601, of modes 1602 of travel, of rates 1603 of travel, or of shortages 1604 (or a combination thereof) as described below. The itineraries undergo one or more updates 1674 such that a prediction 1690 of one or more corresponding travel paths, of one or more connectivity impairment intervals 1682, of one or more download capacity shortages 1683, of preferences or other behavioral predictions 1685, or other features of a predictive model may change (e.g. in response to a detour, service interruption, or other changed circumstance).

Transistor-based circuitry 1600 is an event-sequencing structure generally as described in U.S. Pat. Pub. No. 2015/0094046 but configured as described herein. Transistor-based circuitry 1600 may include one or more instances of navigation modules 1631A-B configured for local processing, for example, each including an electrical node set 1641A-B upon which informational data is represented digitally as a corresponding voltage configuration 1651A-B. In some variants, moreover, an instance of an invocation module (e.g. of special-purpose circuitry 1222) may activate such modules remotely. Transistor-based circuitry 1600 may likewise include one or more instances of prediction modules 1632A-B configured for local processing, for example, each including an electrical node set 1642A-B upon which informational data is represented digitally as a corresponding voltage configuration 1652A-B. Transistor-based circuitry 1600 may likewise include one or more instances of download modules 1633A-B configured for local processing, for example, each including an electrical node set 1643A-B upon which informational data is represented digitally as a corresponding voltage configuration 1653A-B. Transistor-based circuitry 1600 may likewise include one or more instances of output modules 1634A-B configured for local processing, for example, each including an electrical node set 1644A-B upon which informational data is represented digitally as a corresponding voltage configuration 1654A-B. Transistor-based circuitry 1600 may likewise include one or more instances of update modules 1635A-B configured for local processing, for example, each including an electrical node set 1645A-B upon which informational data is represented digitally as a corresponding voltage configuration 1655A-B. Transistor-based circuitry 1600 may likewise include one or more instances of programming modules 1636A-B configured for local processing, for example, each including an electrical node set 1646A-B upon which informational data is represented digitally as a corresponding voltage configuration 1656A-B. Transistor-based circuitry 1600 may likewise include one or more instances of sequencing modules 1637A-B configured for local processing, for example, each including an electrical node set 1647A-B upon which informational data is represented digitally as a corresponding voltage configuration 1657A-B.

In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any records 1591 or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Figure 17:
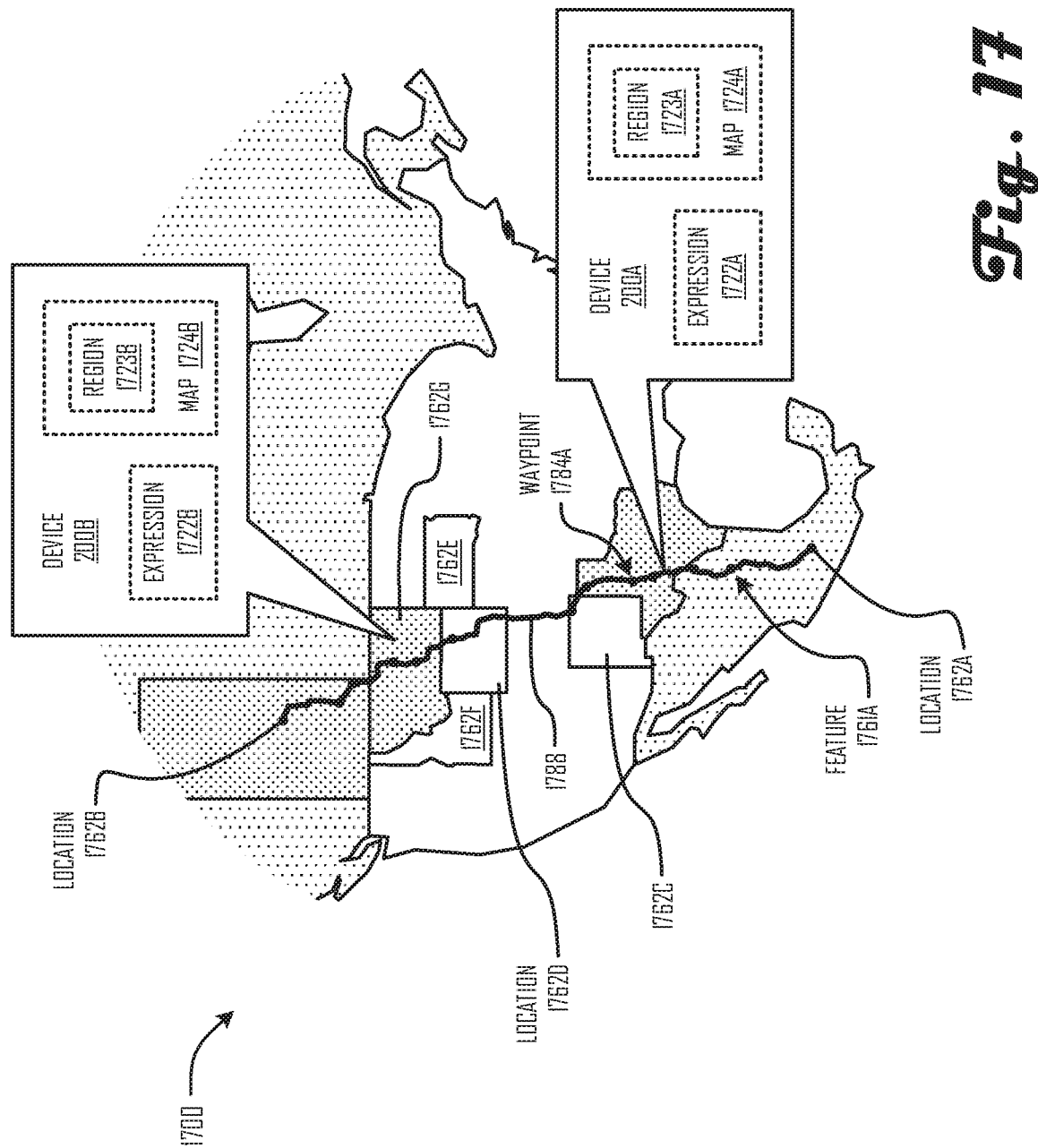
FIG. 17 depicts geographical locations relating to a journey from Mexico to Canada in which motor vehicles or other mobile devices may incorporate one or more improved technologies.

Referring now to FIG. 17, there is shown a travel path 1788 across a North American geographic region 1700 from a start location 1762A (in Mexico City) to an end location 1762B (in Edmonton, Alberta). Such a trip may, for example, pass within sight of one or more noteworthy features 1761A; through one or more waypoints 1784A; and through or near location 1762C (New Mexico), location 1762D (Wyoming), location 1762E (South Dakota), location 1762F (Idaho), location 1762G (Montana), or others as further described below. Even when aboard a commercial flight, a user of a mobile device 1200A-B can feel more like a traveler if works 1220 presented through the flight audibly articulate or otherwise substantively relate to a series of locations 1762 along the route that coincide with the traveler's then-approximate location. Even without using a GPS receiver (in airplane mode, e.g.), a mobile device in route can associate several respective segments 1672 of the flight (in respective states or counties, e.g.) each with one or more corresponding expressions 1722 mentioning or otherwise associated with a feature 1761 within that location 1762 by interpolating between the takeoff and landing places and times. Such expressions may likewise be associated with weather or sports or other current news items about such locations 1762; with songs that mention the expression 1722; with musical or other prominent performers from such locations 1762; or other such works aggregated within the mobile device 1200B in preparation for departure.

When on a road trip or other trek, a user of a mobile device 1200A-B can likewise enrich the journey if works 1220 presented substantively relate to a series of locations 1762 along the route that coincide. As used herein a work 1220 "substantially relates" to a location if it is a news item about the location 1762, if it mentions a place name or other feature 1761 specific to the location 1762, if it is a musical or other artistic expression created by one or more prominent performers from the location 1762 or created in the location, if it is identified by the user 150 in association with the location 1762, or under other selective circumstances like these. In some variants at least a local region 1723A-B of a larger map 1724A-B may (optionally) be stored on the mobile device 1200 so that a playable content sequence 1480 can be adapted locally even through a navigational route change or connectivity map update (e.g. signaling a service outage or other connectivity change) as further described below.

Figure 20:
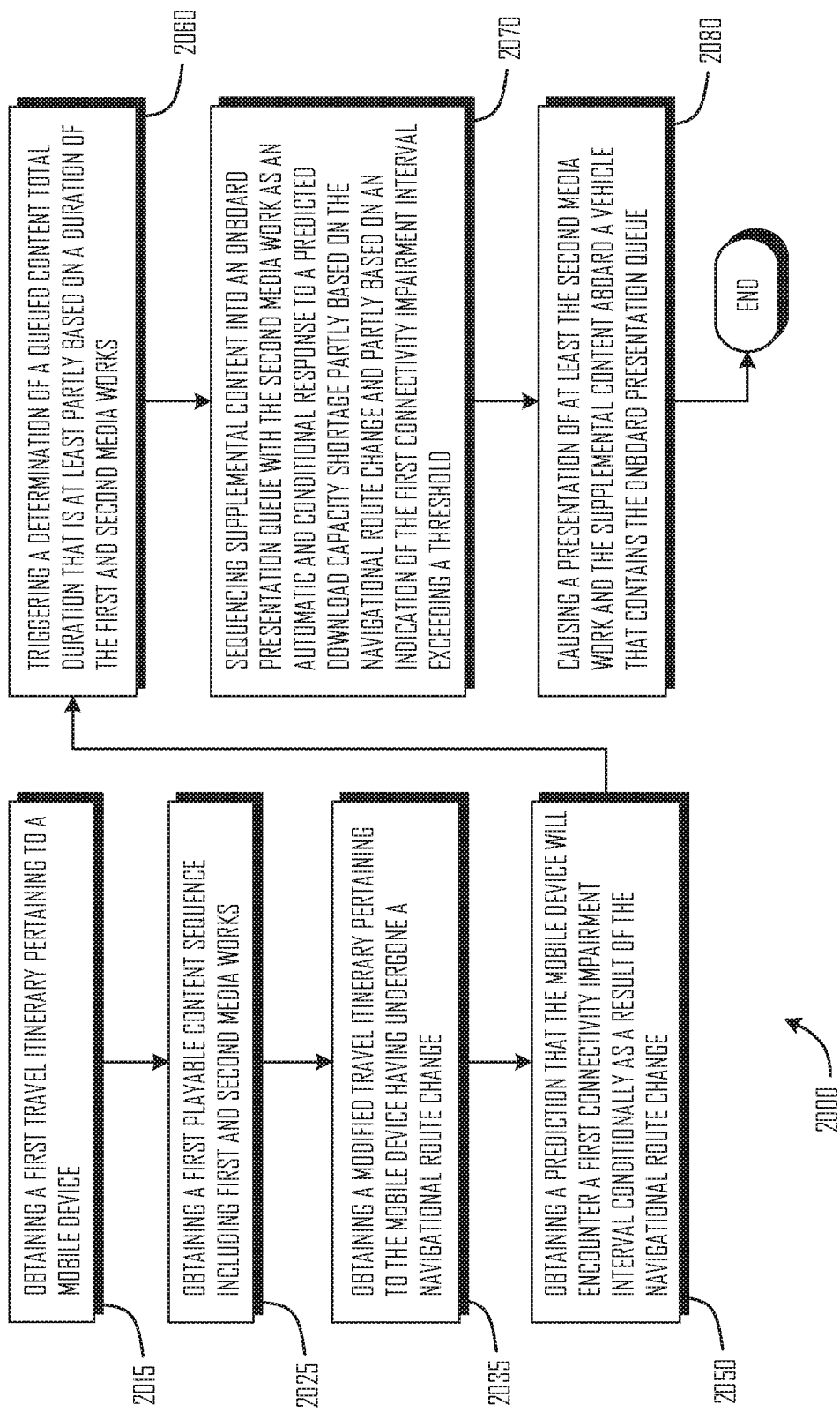
FIG. 20 depicts an adaptive predictive caching operational flow in which one or more improved technologies may be incorporated.

With regard again to the above-described FIGS. 1-17, various methods and systems are described herein by which transistor-based circuitry 1500 may be configured into various modules of event-sequencing transistor-based circuitry 1600. In some variants these modules may associate a map region 1723 corresponding to a geographical location 1762 containing a first feature 1761 with a digital expression 1722 that identifies the first feature 1761; obtain a first itinerary 1685 pertaining to a mobile device 1200, wherein the first itinerary 1685 includes the digital expression 1722 and identifies the travel path 1788 through a first waypoint 1784 of the map region 1723; that obtain a playable content sequence 1480 wherein a first media work 1220 is scheduled for presentation before the mobile device 1200 reaches the first waypoint 1784; that obtain a second media work 1220 that relates to the digital expression 1722; and that automatically update the playable content sequence 1480 to include the second media work 1220 for playback shortly before entering or leaving the geographical location 1762 containing a first feature 1761. This can occur, for example, in a context in which a user of the mobile device may otherwise miss opportunities to make the journey meaningful. Most travel can be enhanced, for example, by including works that relate to geographical locations 1762, especially when the features 1761 within those locations might be visible to occupants of an airplane or other vehicle 180 in which the streaming media or other presentation is occurring. A particular example is shown in FIG. 20.

Figure 18:
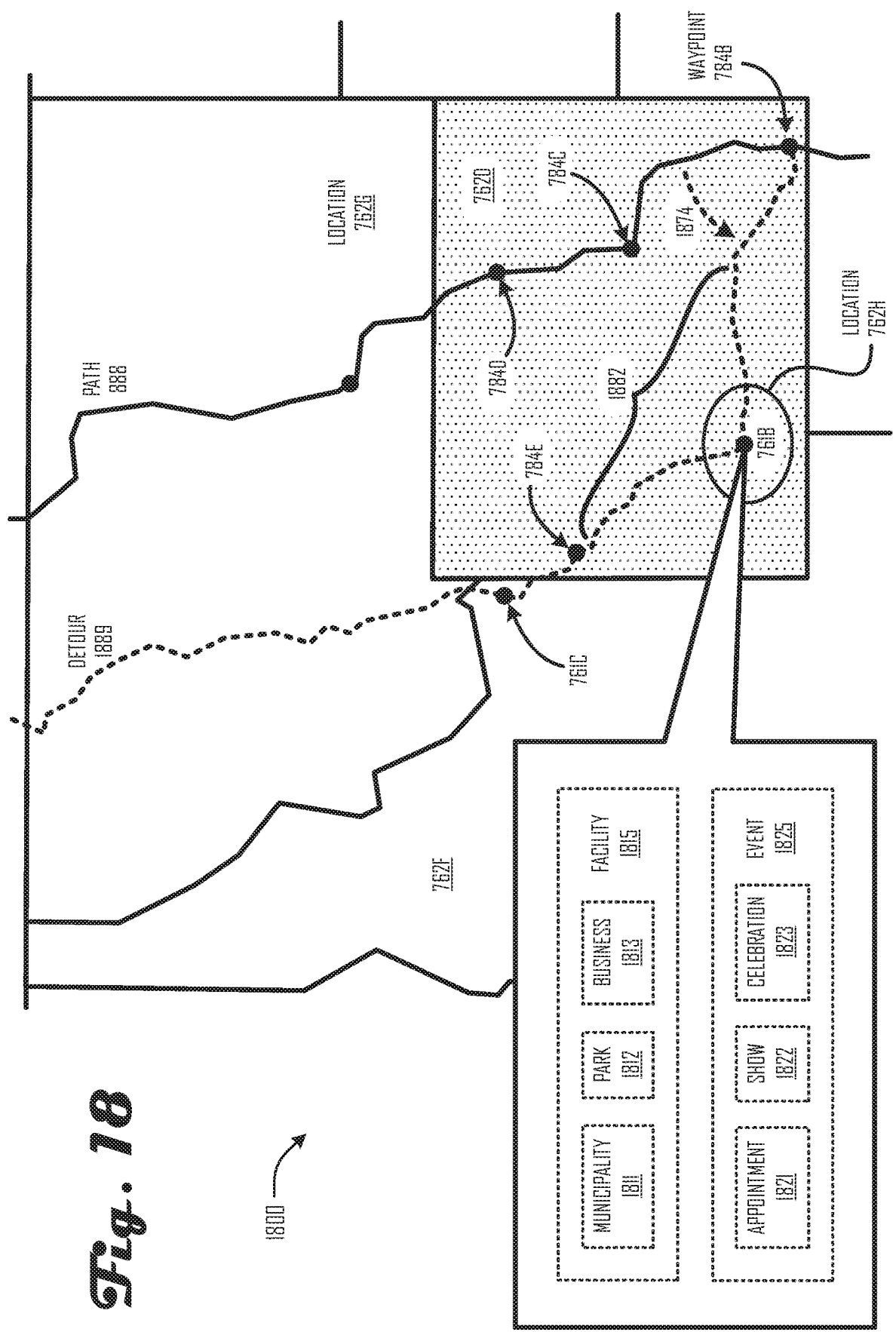
FIG. 18 depicts geographical locations relating to a journey through Wyoming and Montana in which mobile devices may incorporate one or more improved technologies.

Referring now to FIG. 18, there is shown a geographic region 1800 including location 1762D (Wyoming), location 1762E (South Dakota), location 1762F (Idaho), location 1762G (Montana), and location 1762H (comprising Sweetwater County in Wyoming). There is also shown a physical travel path 1888 through waypoint 1784B (at Cheyenne, Wyo.), waypoint 1784C (at Casper), waypoint 1784D (at Buffalo), and location 1762G (Montana). There is also shown a physical detour 1889 from waypoint 1784B (at Cheyenne, Wyo.) and by feature 1761B (in Rock Springs, Wyo.), waypoint 1784E (at Jackson, Wyo.), feature 1761C (in Idaho), and location 1762G (Montana). Various route configurations (e.g. change 1874) are described below, notwithstanding a large zone having a shortage 1604 of wireless connectivity (signaling a duration 1882 on the order of an hour or of a day during which little or no wireless data can be received by a mobile device, e.g.). A duration 1492 and type of such shortages may depend on a traveler's position 1601, mode 1602 of travel (e.g. whether a bicycle or other vehicle 180 is in use), a pause duration or travel rate 1603 relating to each itinerary segment 1672, or other such factors. Making and maintaining such actionable predictions 1690 may depend on one or more indications that the detour 1889 facilitates various facilities 1815 or events 1825 (or both). For example a user 150 whose plans include a visit to a municipality 1811, park 1812, or business 1813 may differ depending on the nature of the visit. Likewise predictions 1690 concerning a user who is (apparently) attending an appointment 1821, show 1822, or celebration 1823 may differ, as further described below.

Figure 21:
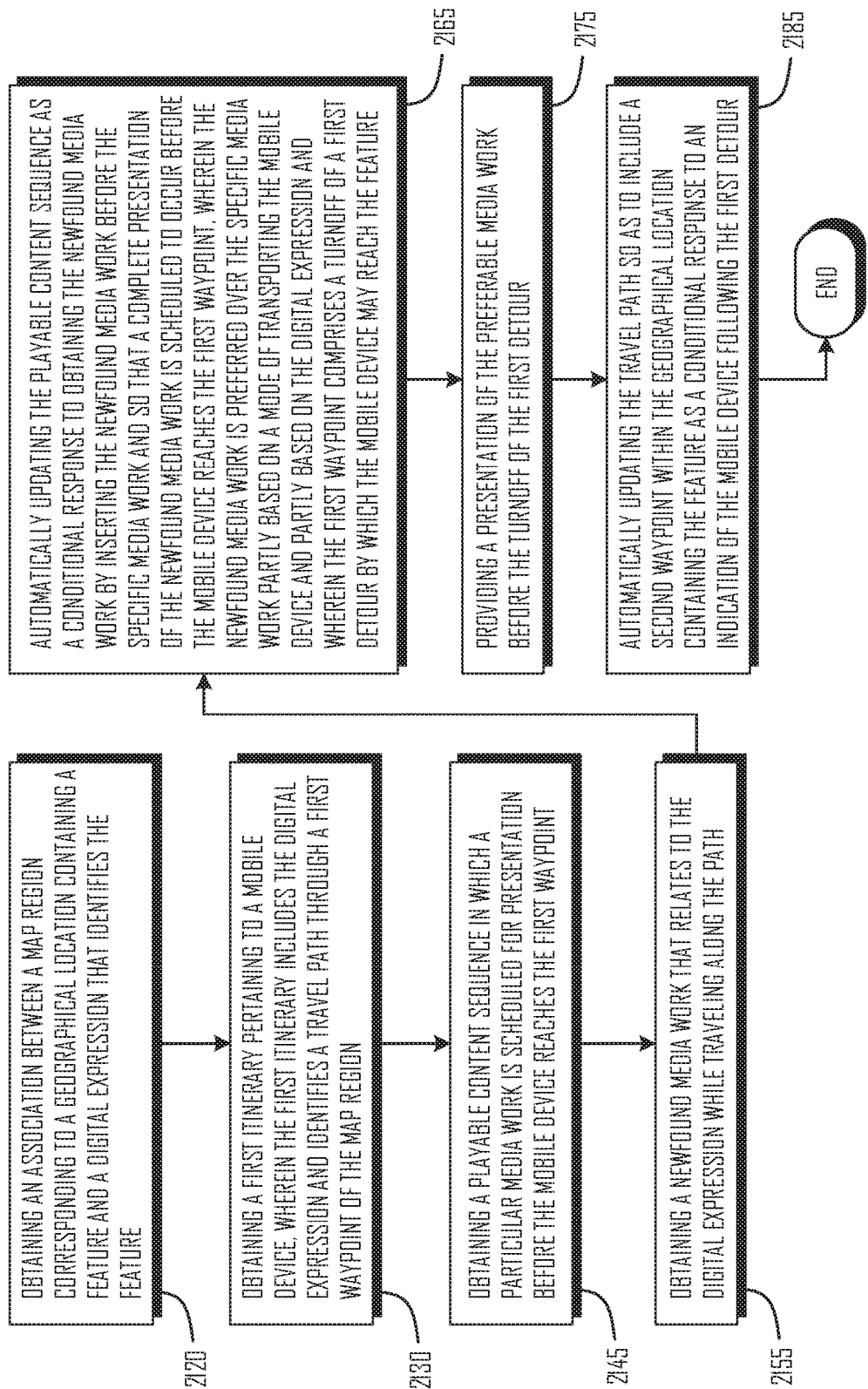
FIG. 21 depicts a geographically tailored content management operational flow in which one or more improved technologies may be incorporated.

With regard to the above-described FIGS. 1-18, various methods are described herein by which transistor-based circuitry 1500 may be configured into various modules of event-sequencing transistor-based circuitry 1600. In some variants these modules may obtain a first playable content sequence 1480 pertaining to a mobile device 1200 including (at least an identification of) first and second media works 1220; obtain a prediction 1690 that a new or modified itinerary 1685 will encounter a first connectivity impairment interval 1682 as a result of a navigational route change or other new travel path; obtain supplemental content 1493 in an onboard queue with (at least) the second media work 1220 as a response to a predicted download capacity shortage 1683 partly based on that change and partly based on a first indication of the first connectivity impairment interval 1682 exceeding an effective threshold or otherwise based on a queued content total duration; and presenting such content from the onboard queue. A particular example is shown in FIG. 21.

Figure 19:
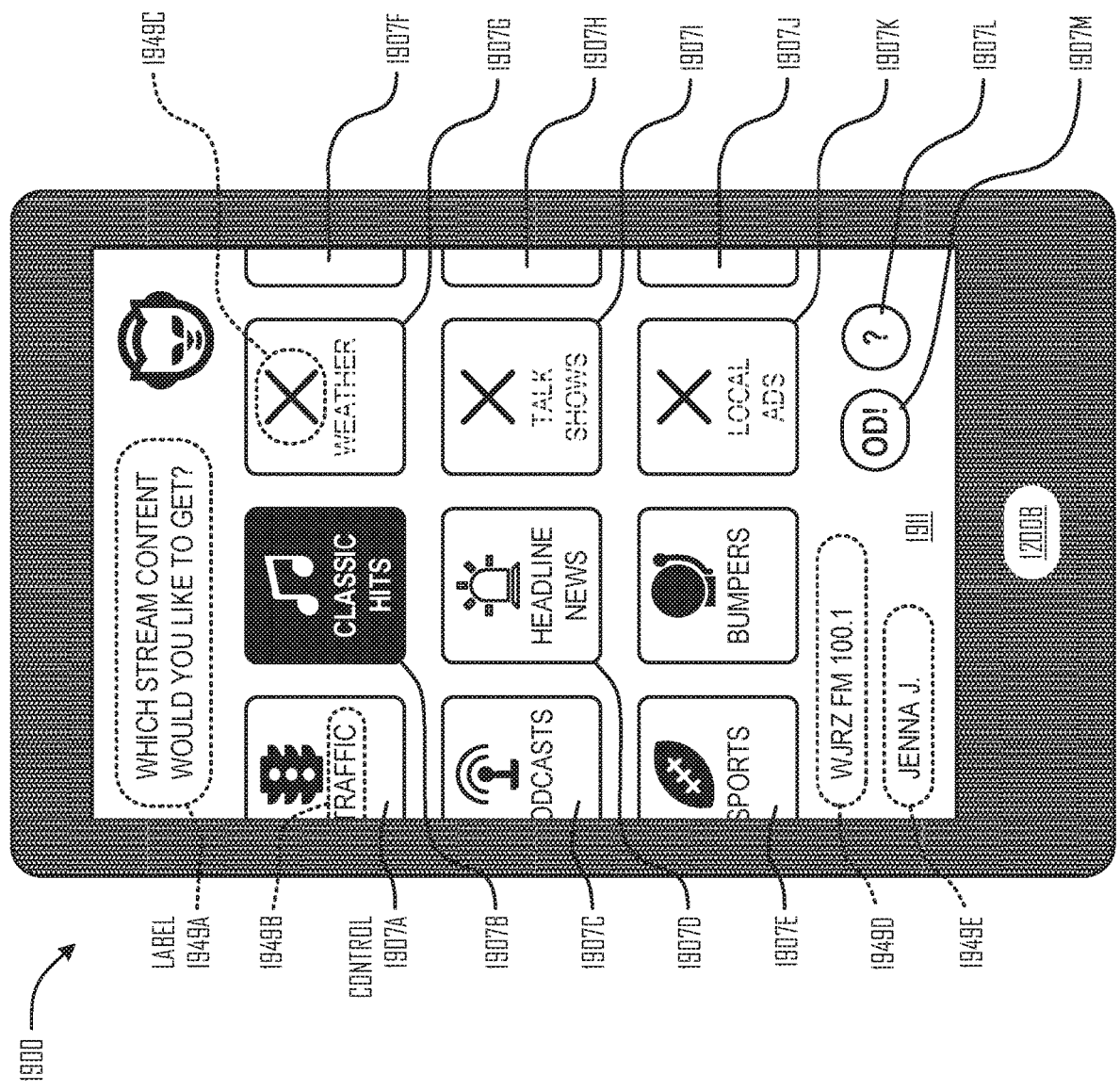
FIG. 19 depicts a system comprising a mobile device displaying an image that includes numerous controls by which a user may express preferences and otherwise invoke circuitry as described herein.

FIG. 19 depicts a system 1900 comprising at least a mobile device 1200B displaying an image 1911 that includes numerous controls 1907A-M by which a user may express preferences 1184 and otherwise trigger modules as described herein. Likewise several labels 1949A-E are shown by which a user 150 may be notified of how the controls 1907 are currently configured and other status information about various operational parameters. Label 1949D, for example, signals an interface by which a user 150 can see (and optionally change) a current streaming broadcast station 210 or other content provider 310. Likewise label 1949E signals an interface by which a user 150 can see (and optionally change) a current user 150 whose profile may affect an operation of a hybrid stream presentation 289. Likewise label 1949A signals an interface by which active controls 1907A-E signify a favorable preference 1184 and inactive controls 1907F-K signify a negative (or lower or disfavorable) preference 1184.

In some variants a user may toggle control 1949C from inactive to active, for example, to signal a transition by which "WEATHER" content is now to have a favorable preference 1184 (or vice versa). Alternatively or additionally, in some variants, such an interface may be configured so that dragging a control to a more favorable position (e.g. upward or leftward) allows a user 150 to signal a favorable preference 1184 more strongly than a control 1907A displaced thereby. Alternatively or additionally, an "On Demand!" control 1907M to allow a user 150 to trigger an instantaneous and temporary interjection of content in an on-demand queue 873 in lieu of finishing a presentation 289 of (one or more snippets 865 of apparently) unwanted live stream content.

FIG. 20 illustrates an operational flow 2000 suitable for use with at least one embodiment, such as may be performed on a mobile device 1200 or server 1300 using special-purpose circuitry thereof. As will be recognized by those having ordinary skill in the art, not all events of information management are illustrated in FIG. 20. Rather, for clarity, only those steps reasonably relevant to describing the distributed ledger interaction aspects of flow 2000 are shown and described. Those having ordinary skill in the art will also recognize the present embodiment is merely one exemplary embodiment and that variations on the present embodiment may be made without departing from the scope of the broader inventive concept set forth in the clauses and claims below.

Operation 2015 describes obtaining a first itinerary pertaining to a mobile device (e.g. one or more instances of navigation modules 1631A receiving or helping to generate a first itinerary 1685A pertaining to a mobile device 1200 on a commute or scheduled vacation such that one or more predictions 1690 will thereafter be available as to an upcoming position 1601 or travel rate 1603 of the mobile device 1200). This can occur, for example, in a context in which the travel itinerary 1685A is manifested digitally as a voltage configuration 1651A on node set 1641A and in which such data is obtained from a calendar, navigation, or other resident app 1214 within the mobile device 1200 or in regard to a train, airplane, bus, or other vehicle 180 having on-schedule starts and stops that is (apparently) carrying the mobile device 1200. Alternatively or additionally, the first itinerary 1685A may include segments 1672 of waiting, walking, sleeping, or other predicted activities or events such as transitions between segments 1672. For example respective segments 1672 may predict a user's expected transitions between walking to a station, waiting for a bus, and riding the bus such that each of these is respectively associated with a travel mode 1602, a direction or lack thereof, and a travel rate 1603.

Operation 2025 describes obtaining a first playable content sequence including at least two media works (e.g. one or more instances of download modules 1633A downloading a first playable content sequence 1480 including at least an identification of first and second media works 1220). This can occur, for example, in a context in which the playable content sequence 1480 is manifested as a voltage configuration 1653A on node set 1643A, in which the works are audio files, in which content sequence 1480 comprises a playlist and in which the download module(s) 1633A receive additional works 1220 via wireless signals 195 (from one or more towers 192 of local broadcast stations) to be presented (within or otherwise in a vicinity 196 of a vehicle 180, e.g.). Alternatively or additionally, in some variants, such a vehicle 180 may itself be the mobile device 1200 by which some or all of the playable content sequence is presented.

Operation 2035 describes obtaining a modified itinerary pertaining to the mobile device having undergone a navigational route change (e.g. one or more instances of navigation modules 1631B obtaining a modified itinerary 1685B pertaining to the mobile device 1200 having encountered or otherwise undergone a navigational route change 1874).

This can occur, for example, in a context in which a user gives an explicit command like "let's detour" with a destination (e.g. to a celebration 1823 or to a municipality 1811, e.g.) or in which an inference of the navigational route change 1874 is drawn from other real-time data. In some variants such inferences may be drawn as a conditional response to a command or other explicit indication 1209 from a user 150 or as a response to an implicit indication 1209 from the user 150 (or both). Such implicit indications 1209 may include (one or more of) a purchase relating to a feature 1761 accessible via the navigational route change 1874 or GPS coordinates 1451A-B of the mobile device 1200 indicating a suggested detour 1889 having been taken (or both). Alternatively or additionally, such a detour 1889 may have been suggested by a digital expression 1722 that identifies one or more features associated with the detour 1889 having been presented (within an hour before reaching a turnoff waypoint 1784B of the detour 1889, e.g.) via the mobile device 1200. Such presentation may have been visual (e.g. via a display screen as presentation hardware 1212) or audible (e.g. via a speaker as presentation hardware 1212), for example (or both).

Operation 2050 describes obtaining a prediction that the modified itinerary will encounter a first connectivity impairment interval conditionally as a result of the navigational route change (e.g. one or more instances of prediction modules 1632A generating a prediction 1690 that the modified itinerary 1685B will apparently experience a first connectivity impairment interval 1682 conditionally as a result of the navigational route change 1874). In some variants, for example, GPS coordinates 1351 of numerous waypoints 1784 (e.g. hundreds or more) can be compared at a server 1300 with a connectivity map 1360 so as to generate an apparent connectivity type 1352 (e.g. local AM radio connectivity, local FM radio connectivity, satellite connectivity, roaming or other cellular connectivity, in-flight connectivity, ad hoc network connectivity, subscription connectivity) or lack thereof (e.g. when the mobile device is in airplane mode) for each of the numerous waypoints 1784 or corresponding segments 1672. This can occur, for example, in a context in which a Boolean indication whether or not a download capacity shortage 1683 is recognized is manifested as a voltage configuration 1652A on node set 1642A in which another instance of operation 2050 is performed by a download module 1633 on the mobile device to obtain the prediction that the modified itinerary will encounter the first connectivity impairment interval by downloading a remote prediction 1690 (from a server 1300 more than a kilometer away, e.g.) containing a predicted first connectivity impairment interval 1682. In some contexts moreover such a connectivity impairment interval 1682 may include an upcoming interval (measured in minutes or hours, e.g.) during which little or no download service is available or an upcoming (component) interval during which a download interval (measured in seconds, e.g.) is too short (because the mobile device has just begun a detour through a region or circumstance of poor connectivity, e.g.) to maintain streaming (i.e. without pausing the presentation) via a download signal 195 presently in use (or both).

Alternatively or additionally, regional portions of a central map 1360 (larger than a square kilometer centered on current position 1601 of mobile device 1200, e.g.) may be downloaded occasionally (e.g. upon each instance of mobile device 1200 having traveled more than a threshold distance, wherein the threshold distance is more than 100 meters). In some variants this allows for an onboard (instance of an) update module 1634 to refresh an onboard (instance of) a prediction 1690 of one or more connectivity impairment intervals 1682 or download capacity shortages 1683 of a series of (two or more) upcoming itinerary segments 1672 locally, within mobile device 1200.

Operation 2060 describes triggering a determination of a queued content total duration that is at least partly based on a duration of the first and second media works (e.g. one or more instances of prediction modules 1632B triggering a downloaded or other summation of a queued content total duration that is at least partly based on a component duration 1492 of each of the first and second media works 1220). This can occur, for example, in a context in which the queued content total duration is manifested as a voltage configuration 1652B on node set 1642B, in which (skip or pause commands or other) playback status information within mobile device 1200 is repeatedly taken into account in updating the queued content total duration computation, and in which such computations effectively facilitate a determination partly based on queue capacity 171 and partly based on download capacity 172 whether or not an actionable download capacity shortage 173 currently exists within mobile device 1200.

Operation 2070 describes sequencing supplemental content into an onboard presentation queue with the second media work as an automatic and conditional response to a predicted download capacity shortage partly based on the navigational route change and partly based on a first indication of the connectivity impairment interval exceeding a threshold (e.g. an instance of a sequencing module 1637 configuring supplemental content 1493 received directly as an FM signal 195 broadcast locally via a tower 192 into an onboard presentation queue comprising content sequence 1480 as an automatic and conditional response to a prediction of one or more download capacity shortages 1683 indicating an upcoming connectivity impairment interval 1682 that is expected to outlast the queue). This can occur, for example, in a context in which a Boolean indication whether or not a download capacity shortage 1683 is expected is manifested as a voltage configuration 1657 on node set 1647 and in which the navigational route change 1874 triggers the sequencing module 1637 to evaluate the sufficiency of the queue contents in light of the upcoming connectivity impairment interval 1682. Such sufficiency may be determined in light of an expected rate of user actions that affect queue depletion (e.g. skip or pause commands) or of any suitable alternative sources that will apparently be available en route.

In some variants the sequencing module 1637 may be configured to download several works 1220 as low definition playable data 1222 before or in lieu of any corresponding high definition playable data 1221. This can occur, for example, in a context in which not much onboard memory 1204 is available for the queue or in which rapid buildup of content in the queue is (apparently) necessary for responding to the download capacity shortage 1683 (e.g. due to one of the connectivity impairment intervals 1682 corresponds to a segment 1672 in which no supplemental content 1493 will be available by virtue of mobile device 1200 being in an airplane mode).

FIG. 21 illustrates an operational flow 2100 suitable for use with at least one embodiment, such as may be performed on a mobile device 1200 or server 1300 using special-purpose circuitry thereof. As will be recognized by those having ordinary skill in the art, not all events of information management are illustrated in FIG. 21. Rather, for clarity, only those steps reasonably relevant to describing the distributed ledger interaction aspects of flow 2100 are shown and described. Those having ordinary skill in the art will also recognize the present embodiment is merely one exemplary embodiment and that variations on the present embodiment may be made without departing from the scope of the broader inventive concept set forth in the clauses and claims below.

Operation 2120 describes obtaining an association between a map region corresponding to a geographical location containing a feature and a digital expression that identifies the feature (e.g. one or more download modules 1633 obtaining an association 1233 between a map region 1723 of Texas corresponding to a geographical location 1762 of Texas containing a feature 1761 of the Alamo and a digital expression 1722 that identifies the feature 1761). This can occur, for example, in a context in which the digital expression 1722 includes a natural language expression (e.g. "the Alamo" or a street address) or GPS coordinates defining a boundary thereof and in which the association 1233 is manifested digitally as a voltage configuration 1653 on node set 1643.

Operation 2130 describes obtaining a first itinerary pertaining to a mobile device, wherein the first itinerary includes the digital expression and identifies a travel path through a first waypoint of the map region (e.g. one or more instances of download modules 1633 or sequencing modules 1637 sending, receiving, adapting, or generating a first itinerary 1685 pertaining to mobile device 1200). This can occur, for example, in a context in which the first itinerary 1685 identifies a travel path 1788, 1888 through a (turnoff to or other) first waypoint 1784 of the map region 1723; in which the travel path 1788, 1888 is manifested as a voltage configuration on one or more of the modules' node sets 1643, 1647; in which the first itinerary 1685 includes the digital expression 1722 and other expressions of interest (e.g. identifiers of places or works 1220 associated with the feature).

Operation 2145 describes obtaining a playable content sequence in which a particular media work is scheduled for presentation before the mobile device reaches the first waypoint (e.g. one or more instances of download modules 1633 or programming modules 1636 obtaining a playable content sequence 1480 in which a particular song is scheduled for presentation before the mobile device 1200 reaches the first waypoint 1784B). This can occur, for example, in a context in which the song is a (first instance of a) media work 1220 and is scheduled before the mobile device 1200 reaches Cheyenne (Wyoming); in which the first waypoint 1784B comprises a turnoff to a potential detour 1889 at Cheyenne; and in which a record 1486B about the song signals a score indicative of a medium preferability relative to that of other media works 1220 described by other records 1486; and in which (at least) the preferability score of the playable content sequence 1480 is manifested as a voltage configuration on one or more of the modules' node sets 1643, 1646.

Operation 2155 describes obtaining a newfound media work that relates to the digital expression while traveling along the path (e.g. one or wireless signal receivers 1232 receiving first and second media works 1220 while traveling along a path 1788, 1888 toward one of the geographical locations 1762D-H containing a feature 1761 identified by the digital expression 1722). Each instance of operation 2155 may occur, for example, in a context in which the newfound media work 1220 is received via a wireless signal 195 while traveling northbound toward the first waypoint 1784B at Cheyenne and in which the newfound media work 1220 comprises a broadcast announcement about the feature 1761. "Newfound" as used herein refers to content items acquired after an initial playable content sequence 1480 is determined unless context dictates otherwise.

Operation 2165 describes automatically updating the playable content sequence as a conditional response to obtaining the newfound media work by inserting the newfound media work before the first media work and so that a complete presentation of the newfound media work is scheduled to occur before the mobile device 1200 reaches the first waypoint (e.g. one or more instances of update modules 1634 automatically modifying the playable content sequence 1480 as a conditional response to obtaining the newfound media work 1220 by inserting the newfound media work 1220 so that a complete presentation of the newfound media work 1220 is predicted to occur before the mobile device 1200 reaches the first waypoint 1784). This can occur, for example, in a context in which the first waypoint 1784 comprises a turnoff of a first detour 1889 by which the mobile device 1200 may reach the feature 1761; in which the newfound media work 1220 is found to be suitable for timely insertion into the playable content sequence 1480 partly based on a travel mode 1602 by which the mobile device 1200 is moving and partly based on the digital expression 1722 being uncommon enough that a user 150 is reasonably likely to appreciate the timely reminder. Alternatively or additionally, such newfound media works 1220 may occur repeatedly while traveling in segments 1672 (e.g. of hours or days) through areas in which streaming data or other downloads are available.

Operation 2175 describes providing a presentation of the preferable media work before the turnoff of the first detour by which the mobile device may reach the feature (e.g. one or more instances of speakers, display screens, or other output modules 1634 causing or otherwise implementing a presentation of the preferable media work 1220 before the mobile device reaches the turnoff of the first detour 1889 leading to the feature 1761). This may occur, for example, in a context in which the detour 1889 is the only practical way by which the mobile device 1200 may reach the feature 1761B and in which no user 150 has yet taken any action to signal an acceptance of a candidate itinerary 1685B by which the mobile device 1200 may reach or participate in the feature 1761.

Operation 2185 describes automatically updating the travel path so as to include a second waypoint within the geographical location containing the feature as a conditional response to an indication of the mobile device following the first detour (e.g. a navigation module 1631 and an update modules 1634 jointly updating a series of GPS coordinates 1351 digitally specifying a travel path 1788, 1888 so as to include a second waypoint 1784 within the geographical location 1762 containing the feature 1761 as an automatic and conditional response to an indication of the mobile device 1200 following the first detour 1889). This can occur, for example, in a context in which the travel path 1788, 1888 is thereby updated so as to include the second waypoint 1784 within the geographical location 1762F-H containing the feature 1761. Alternatively or additionally, operational flow 2100 may thereafter describe automatically updating the itinerary 1685 again (1) so as to exclude the second waypoint 1784 as a conditional response to an indication of the mobile device 1200 resuming the travel path 1788, 1888 past the first waypoint in lieu of following the first detour 1889 and also (2) so as to modify the playable content sequence 1480 to remove at least one reference to the first feature 1761, wherein the at least one reference includes or otherwise relates to the digital expression 1722 that identifies the first feature 1761.

FIG. 22 illustrates an operational flow 2200 suitable for use with at least one embodiment, such as may be performed on a mobile device 1200 or server 1300 using special-purpose circuitry thereof.

Operation 2205 describes obtaining categorical first metadata pertaining to one or more programmed segments of a first live stream during a presentation of the first live stream wherein the categorical first metadata includes a category identifier pertaining to the one or more programmed segments including a first programmed segment currently being presented (e.g. a first module of transistor-based special-purpose circuitry 1222, 1322 obtaining categorical first metadata 1175 pertaining to one or more programmed segments of a first live stream 272, 472 during a presentation 289 of the first live stream 272, 472). This can occur, for example, in a context in which the one or more programmed segments comprise events 561, 861 like those of FIGS. 5-8 and in which the categorical first metadata 1175 includes one or more category identifiers 1056, 1156 pertaining to the one or more programmed segments including a first programmed segment (e.g. as event 861A) that includes (at least) a first snippet 865 (exactly or otherwise) at a concluding portion of a content item currently being presented.

Operation 2225 describes obtaining an indication of a first user control signaling a user request for on-demand content 767 (e.g. a second module of transistor-based special-purpose circuitry 1222, 1322 obtaining an indication 1209 of an activation of a first user control 1907M signaling a user request 861G for immediate on-demand content 767, 1167). This can occur, for example, in a context in which the user control 1907M has a label 1949 that toggles from "On Demand!" or the like to "Live!" or the like to signal an opportunity for the user 150 to switch immediately to on-demand presentation 289 or to switch back immediately to live stream presentation 289, respectively, Operation 2240 describes selecting a first on-demand content item partly based on a transitional first notification and partly based on a resumptive second notification (e.g. a third module of transistor-based special-purpose circuitry 1222, 1322 obtaining a selection manifested as an action 1182 of at least a first on-demand content item partly based on a transitional first notification 881 and partly based on a resumptive second notification 881). This can occur, for example, in a context in which the transitional notification 881 announces "Temporarily Switching to On-Demand" visibly or audibly (or both) or in which the resumptive notification 881 announces "Now Switching Back to Broadcast Streaming" visibly or audibly.

Operation 2255 describes interrupting the presentation of the first live stream by inserting both the transitional first notification and the first on-demand content item so as to displace at least some of the first programmed segment as a conditional response to one or more indications of a first user preference pertaining to the first on-demand content item over a second user preference pertaining to the first programmed segment partly based on the first and second user preferences and partly based on a category identifier pertaining to the later-programmed second programmed segment, wherein the first user preference is manifested as an activation of a first user control signaling an immediate user request for on-demand content 767 (e.g. a fourth module of transistor-based special-purpose circuitry 1222, 1322 conditionally causing an interruption of the first live stream 272, 472 by inserting both the transitional first notification 881 and the first on-demand content item so as to displace at least some of the first programmed segment as a conditional response to one or more indications 1183 of a first implicit or other user preference 1184 pertaining to the first on-demand content item over a second user preference 1184 pertaining to the first programmed segment partly based on the first and second user preferences 1184 and partly based on one or more category identifiers 1056, 1156 pertaining to the later-programmed second programmed segment, wherein the first user preference 1184 is manifested as an activation of a first user control 1907M signaling a user request 861G for on-demand content 767, 1167). This can occur for example, in a context in which the one or more on-demand content items comprise an on-demand file 467 or other playable content 767, 1167 as an inserted on-demand event 561 and in which the later-programmed second programmed segment comprises event 861E.

Operation 2290 describes automatically and conditionally resuming the first live stream by presenting a resumptive second notification and then the later-programmed second programmed segment after a presentation of the first on-demand content item, wherein a local presentation of the first snippet is thereby omitted (e.g. a fifth module of transistor-based special-purpose circuitry 1222, 1322 automatically and conditionally causing a resumption of the first live stream 272, 472 by causing a presentation 289 of a resumptive second notification 881 and then the later-programmed second programmed segment after a local presentation 289 of the first on-demand content item). This can occur, for example, in a context in which a local presentation 289 of at least the first snippet 865 at the concluding portion of the content item is thereby omitted from the local presentation 289 of the first live stream 272, 472.

In light of teachings herein, numerous existing techniques may be applied for configuring special-purpose circuitry or other structures effective for sequencing, aggregating, comparing, receiving, evaluating, and other operations as described herein without undue experimentation. See, e.g., U.S. Pat. No. 9,918,036 ("System and method for recording and distributing media content"); U.S. Pat. No. 9,898,466 ("Media preference affinity recommendation systems and methods"); U.S. Pat. No. 9,876,762 ("Cost-effective mobile connectivity protocols"); U.S. Pat. No. 9,591,485 ("Provisioning subscriptions to user devices"); U.S. Pat. No. 9,529,979 ("Providing content items from alternate sources"); U.S. Pat. No. 9,456,469 ("Heading-dependent routing method and network subsystem"); U.S. Pat. No. 9,940,632 ("Real-time broadcast content synchronization database system"); U.S. Pat. No. 9,148,907 ("Heading-dependent routing"); U.S. Pat. No. 8,706,732 ("Managing information about entities using clusters of received observations"); U.S. Pat. No. 7,089,301 ("System and method for searching peer-to-peer computer networks by selecting a computer based on at least a number of files shared by the computer"); U.S. Pub. No. 20180134171 ("System and method for predictive control of an energy storage system for a vehicle"); U.S. Pub. No. 20150066685 ("System and method for digital content discovery, recommendations and purchasing"); U.S. Pub. No. 20140274078 ("Protocols for facilitating broader access in wireless communications"); U.S. Pub. No. 20140039881 ("Speech recognition adaptation systems based on adaptation data"); U.S. Pub. No. 20130081084 ("Recommended media content based channel surfing methods and systems"); U.S. Pub. No. 20130046766 ("Item selecting apparatus, item selecting method and item selecting program"); U.S. Pub. No. 20100318544 ("Device and method for selecting at least one media for recommendation to a user"); U.S. Pub. No.

20100088151 ("Method and apparatus for recommending image based on user profile using feature-based collaborative filtering to resolve new item recommendation"); U.S. Pub. No. 20090112817 ("Returning a new content based on a person's reaction to at least two instances of previously displayed content"); U.S. Pub. No. 20090112713 ("Opportunity advertising in a mobile device"); U.S. Pub. No. 20090112697 ("Providing personalized advertising"); U.S. Pub. No. 20090055377 ("Collaborative Media Recommendation and Sharing Technique"); U.S. Pub. No. 20090049045 ("Method and system for sorting media items in a playlist on a media device"); and U.S. Pub. No. 20070028266 ("Recommendation of video content based on the user profile of users with similar viewing habits").

Although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, first combinations of aspects and embodiments are articulated in a shorthand form such that (1) according to respective embodiments, for each instance in which a "component" or other such identifiers appear to be introduced (e.g. with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES 1. (Independent) A media-presentation-conscious scheduling method comprising:

invoking transistor-based circuitry (e.g., an instance of a navigation module 1631A) configured to obtain a first itinerary 1685A pertaining to a mobile device 1200;

invoking transistor-based circuitry (e.g., a download module 1633A) configured to obtain a first streaming playable content sequence 1480 including (at least an identification of) first and second media works 1220;

invoking transistor-based circuitry (e.g., an instance of a navigation module 1631B) configured to obtain a modified itinerary 1685B pertaining to the mobile device 1200 having (encountered or otherwise) undergone a navigational route configuration (i.e. a creation or change 1874);

invoking transistor-based circuitry (e.g., a prediction modules 1632A) configured to obtain a prediction 1690 that the modified itinerary 1685B will (apparently) encounter a first connectivity impairment interval 1682 conditionally as a result of the navigational route creation or change 1874;

invoking transistor-based circuitry (e.g., a prediction modules 1632B and download module 1633A jointly) configured to trigger a (remotely transmitted sum or other) determination of a queued content total duration 1492 that is at least partly based on a (component) duration 1492 of (each of) the first and second media works 1220; and invoking transistor-based circuitry (e.g., an instance of a sequencing modules 1637) configured to trigger an insertion of supplemental content 1493 into an onboard presentation queue with (at least) the second media work 1220 as an automatic and conditional response to a predicted download capacity shortage 1683 partly based on the navigational route creation or change 1874 and partly based on a first indication of the first connectivity impairment interval 1682 (exceeding an effective threshold or otherwise) relative to the queued content total duration 1492.

2. (Independent) A media-presentation-conscious scheduling method comprising:

invoking transistor-based circuitry (e.g., an instance of a download module 1633 and sequencing module 1637 jointly) configured to obtain an association 1233 between a map region 1723 corresponding to a geographical location 1762 containing a feature 1761 and a digital expression 1722 that identifies the feature 1761;

invoking transistor-based circuitry (e.g., an instance of a download module 1633 or sequencing module 1637) configured to obtain a first itinerary 1685 pertaining to a mobile device 1200, wherein the first itinerary 1685 includes the digital expression 1722 and identifies a travel path 1788, 1888 through a first waypoint 1784 of the map region 1723;

invoking transistor-based circuitry (e.g., one or more download modules 1633 or programming modules 1636) configured to obtain a playable content sequence 1480 wherein first media work 1220 is scheduled for presentation before the mobile device 1200 reaches the first waypoint 1784;

invoking transistor-based circuitry (e.g., an instance of a wireless signal receiver 1232 or download module 1633) configured to obtain a second media work 1220 that relates to the digital expression 1722 after the mobile device has begun traveling along the path 1788, 1888;

automatically invoking transistor-based circuitry (e.g., one or more update modules 1231) configured to update the playable content sequence 1480 as a conditional response to obtaining the second media work 1220 by inserting the second media work 1220 so that a complete presentation of the second media work 1220 is scheduled to occur before the mobile device 1200 reaches the first waypoint 1784, wherein the second media work 1220 is preferred over the first media work 1220 (at least partly) based on a mode of transporting the mobile device 1200; and invoking transistor-based circuitry (e.g., an instance of a transceiver or other output module 1634) configured to present or otherwise cause a presentation of the preferable media work 1220 before the mobile device reaches the first waypoint.

3. (Independent) A media-presentation-conscious scheduling method comprising:

invoking transistor-based circuitry configured to obtain categorical first metadata 1175 pertaining to one or more programmed segments (e.g. as one or more events 861) of a first live stream 272, 472 during a presentation 289 of the first live stream 272, 472, wherein the categorical first metadata 1175 includes one or more category identifiers 1056, 1156 pertaining to the one or more programmed segments including a first programmed segment;

invoking transistor-based circuitry configured to obtain a selection (e.g. manifested as an action 1182) of at least a first on-demand content item;

invoking transistor-based circuitry configured to cause an interruption of the first live stream 272, 472 conditionally by causing an insertion of the first on-demand content item (e.g. an on-demand file 467 or other playable content 767, 1167 as an inserted on-demand event 561) so as to displace at least some of the first programmed segment as a conditional response to one or more indications 1183 of a first (implicit or other) user preference 1184 pertaining to the first on-demand content item; and automatically invoking transistor-based circuitry configured to cause a resumption of the first live stream 272, 472 by causing a presentation 289 of the later-programmed second programmed segment after a presentation 289 of at least some of the first on-demand content item, wherein the presentation 289 of at least some of the first programmed segment is thereby omitted.

4. The media-presentation-conscious scheduling method of ANY of Clauses 1-3, comprising:

installing all of the transistor-based circuitry within the mobile device 1200.

5. The media-presentation-conscious scheduling method of ANY of Clauses 1-3, comprising:

installing all of the transistor-based circuitry within one or more servers 1300 remote from the mobile device 1200.

6. The media-presentation-conscious scheduling method of ANY of Clauses 1-3, comprising:

installing all of the transistor-based circuitry within a motor vehicle 180; and bearing the mobile device 1200 aboard the motor vehicle 180 while moving.

7. The media-presentation-conscious scheduling method of ANY one of the above method clauses, comprising:

selecting a first on-demand content item partly based on a duration of a transitional first notification 881 configured to be inserted into a presentation 289 of a first live stream 272, 472 to signal the first on-demand content item and partly based on a duration of a resumptive second notification 881 to signal a resumption of the first live stream 272.

8. The media-presentation-conscious scheduling method of ANY one of the above method clauses, comprising:

selecting a first on-demand content item partly based on a duration of a transitional first notification 881 configured to be inserted into a presentation 289 of a first live stream 272, 472 to signal the first on-demand content item and partly based on a duration of a resumptive second notification 881 to signal a resumption of the first live stream 272, wherein at least one of a transitional first notification 881 or a resumptive second notification 881 is instantaneous.

9. The media-presentation-conscious scheduling method of ANY one of the above method clauses, comprising:

including in a presentation at least one of a transitional first notification 881 before and within one second of a first on-demand content item.

10. The media-presentation-conscious scheduling method of ANY one of the above method clauses, comprising:

including in a presentation 289 a transitional first notification 881 before and ending within one second of a first on-demand content item.

11. The media-presentation-conscious scheduling method of ANY one of the above method clauses, comprising:

including in a presentation 289 a resumptive notification 881 before and ending within one second of a later-programmed second programmed segment.

12. The media-presentation-conscious scheduling method of ANY one of the above method clauses, comprising:

including in a presentation 289 both a transitional first notification 881 before and ending within one second of a first on-demand content item and a resumptive notification 881 before and ending within one second of a later-programmed second programmed segment.

13. The media-presentation-conscious scheduling method of ANY one of the above method clauses, comprising:

including in a presentation 289 both a transitional first notification 881 before and ending within one second of a first on-demand content item and a resumptive notification 881 before and ending within one second of a later-programmed second programmed segment, wherein at least one of the first and second notifications 881 is instantaneous.

14. The media-presentation-conscious scheduling method of ANY one of the above method clauses, comprising:

including in a presentation 289 both a transitional first notification 881 before and ending within one second of a first on-demand content item and a resumptive notification 881 before and ending within one second of a later-programmed second programmed segment, wherein at least one of a first and second notifications 881 includes a visible component (e.g. a label 1949 appearing in or disappearing from an image 1911 displayed to a user 150).

15. The media-presentation-conscious scheduling method of ANY one of the above method clauses, wherein obtaining a selection of an on-demand content item comprises:

selecting a first on-demand content item partly based on a category identifier 1156 pertaining to the first on-demand content item having been selected for inclusion by a user (e.g. as action 1182 taken by user 150) via a client device 1200A-B that provides one or more controls 1907 pertaining (directly) to a presentation 289 of a first live stream 272, 472.

16. The media-presentation-conscious scheduling method of ANY one of the above method clauses, wherein obtaining a selection of an on-demand content item comprises:

selecting a first on-demand content item partly based on a category identifier 1156 pertaining to a first on-demand content item having been selected for inclusion by a user (e.g. as action 1182 taken by user 150) via a client device 1200A-B that provides one or more labels 1949 pertaining to a presentation 289 of a first live stream 272, 472.

17. The media-presentation-conscious scheduling method of ANY one of the above method clauses, wherein an insertion of one or more on-demand content items having a total duration 1492 in place of a first programmed segment induces a first content-insertion-induced lag 1168 that depends upon a duration 1492 of a first on-demand content item, comprising:

automatically reducing a content-insertion-induced lag 1168 in a first live stream 272, 472.

18. The media-presentation-conscious scheduling method of ANY one of the above method clauses, comprising:

automatically reducing a lag 1168 in a first live stream 272, 472 by omitting (at least) a later-programmed third programmed segment.

19. The media-presentation-conscious scheduling method of ANY one of the above method clauses, comprising:

automatically reducing a lag 1168 in a first live stream 272, 472 by accelerating a playback of (at least) a later-programmed programmed segment.

20. The media-presentation-conscious scheduling method of ANY one of the above method clauses, comprising:

automatically reducing a lag 1168 in a first live stream 272, 472 by implementing an accelerated playback of an additional later-programmed programmed segment as a (selectively) conditional response to an indication that an additional later-programmed programmed segment is suitable for an accelerated playback.

21. The media-presentation-conscious scheduling method of ANY one of the above method clauses, comprising:

automatically reducing a lag 1168 in a first live stream 272, 472 by implementing an accelerated playback of an additional later-programmed programmed segment as a conditional response to an indication that an additional later-programmed programmed segment is not musical.

22. The media-presentation-conscious scheduling method of ANY one of the above method clauses, comprising:

automatically reducing a lag 1168 in a first live stream 272, 472 by implementing an accelerated playback of an additional later-programmed programmed segment as a conditional response to metadata 1175 indicating that an additional later-programmed programmed segment is not musical.

23. The media-presentation-conscious scheduling method of ANY one of the above method clauses, comprising:

automatically reducing a lag 1168 in a first live stream 272, 472 by implementing an accelerated playback of an additional later-programmed programmed segment, wherein an accelerated playback causes a reduction in a duration of an additional later-programmed programmed segment (that is) within an order of magnitude of 1%.

24. The media-presentation-conscious scheduling method of ANY one of the above method clauses, comprising:

automatically reducing a lag 1168 in a first live stream 272, 472 by implementing an accelerated playback of an additional later-programmed programmed segment, wherein an accelerated playback causes a reduction in a duration of an additional later-programmed programmed segment within an order of magnitude of 5%.

25. The media-presentation-conscious scheduling method of ANY one of the above method clauses, wherein causing an interruption of a first live stream comprises:

obtaining a first user preference 1184 manifested as an activation of a first user control 1907.

26. The media-presentation-conscious scheduling method of ANY one of the above method clauses, wherein causing an interruption of a first live stream comprises:

obtaining a first user preference 1184 manifested as an activation of a first user control 1907M signaling a user request 861G for on-demand content 767, 1167.

27. The media-presentation-conscious scheduling method of ANY one of the above method clauses, wherein causing an interruption of a first live stream comprises:

determining that a current user 150 ranks one or more category identifiers 1056, 1156 pertaining to a first on-demand content item above one or more category identifiers 1056, 1156 pertaining to a first programmed segment as a first preference 1184 (e.g. using one or more controls 1907 of an interface like that of FIG. 19).

28. The media-presentation-conscious scheduling method of ANY one of the above method clauses, comprising:

selecting a notification 881 (at least partly) based on a first on-demand content item (at least partly) based on a transitional notification 881; and presenting a notification 881 before a first live stream 272, 472 is resumed.

29. The media-presentation-conscious scheduling method of ANY one of the above method clauses, wherein selecting a first on-demand content item comprises:

causing a category identifier pertaining to the first on-demand content item to be presented to a user with one or more other category identifiers;

receiving an indication of one or more other category identifiers being disfavored by a user in lieu of any indication the user disfavors a category identifier pertaining to a first on-demand content item.

30. The media-presentation-conscious scheduling method of ANY one of the above method clauses, wherein first waypoint 1784 thereof comprises a turnoff of a first (optional) detour 1889 thereof by which a mobile device 1200 may reach a suggested feature 1761 and wherein causing a presentation of a preferable media work 1220 before a mobile device reaches a first waypoint comprises presenting a preferable media work 1220 before the mobile device reaches a turnoff of a first detour 1889 toward a feature 1761.

31. The media-presentation-conscious scheduling method of ANY one of the above method clauses, wherein updating a playable content sequence 1480 comprises:

determining that a mode of transporting a mobile device 1200 is on foot based on at least one of pedestrian-indicative user input (e.g. in a navigation app) or by determining that the mobile device 1200 is traveling along a walkway at pedestrian speeds (or both); and determining that a second media work 1220 is preferred over a first media work 1220 partly based on a mode of transporting the mobile device 1200 and partly based on a digital expression 1722 being in a genre or other category of media works 1220 that pedestrians terminate with a lower-than-nominal frequency, wherein lower-than-nominal frequency is measured as lower than a predetermined threshold frequency pertaining specifically to pedestrians (e.g. set by a user or a service provider).

32. The media-presentation-conscious scheduling method of ANY one of the above method clauses, wherein updating a playable content sequence 1480 comprises:

determining that a mode of transporting a mobile device 1200 is aboard a bicycle based on at least one of bicycle-indicative user input (e.g. in a navigation app) or by determining that the mobile device 1200 is traveling along a roadway at bicycle speeds (or both); and determining that a second media work 1220 is preferred over a first media work 1220 partly based on a mode of transporting the mobile device 1200 and partly based on a digital expression 1722 being in a genre or other category of media works 1220 that bicyclists terminate with a lower-than-nominal frequency, wherein lower-than-nominal frequency is measured as lower than a predetermined threshold frequency pertaining specifically to bicyclists (e.g. set by a user or a service provider).

33. The media-presentation-conscious scheduling method of ANY one of the above method clauses, wherein updating a playable content sequence comprises:

determining that a mode of transporting a mobile device 1200 is aboard a motorized passenger vehicle based on at least one of automobile-indicative user input (e.g. in a navigation app) or by determining that the mobile device 1200 is traveling along a highway at highway speeds (or both); and determining that a second media work 1220 is preferred over a first media work 1220 partly based on a mode of transporting the mobile device 1200 and partly based on a digital expression 1722 being in a genre or other category of media works 1220 that a user terminates with a lower-than-nominal frequency, wherein lower-than-nominal frequency is measured as lower than a predetermined threshold frequency for that particular user (e.g. set by the user or a service provider).

34. The media-presentation-conscious scheduling method of ANY one of the above method clauses, wherein updating a playable content sequence comprises:

determining that a mode of transporting a mobile device 1200 is aboard a motorized passenger vehicle based on at least one of automobile-indicative user input (e.g. in a navigation app) or by determining that the mobile device 1200 is traveling along a highway at highway speeds (or both); and determining that a second media work 1220 is preferred over a first media work 1220 partly based on a mode of transporting the mobile device 1200 and partly based on a digital expression 1722 being in a genre or other category of media works 1220 that a user terminates with a lower-than-nominal frequency, wherein lower-than-nominal frequency is measured as lower than an average frequency (e.g. of 2.3 times per hour of listening) characteristic of that particular user or of a cohort of users including that particular user.

35. The media-presentation-conscious scheduling method of ANY one of the above method clauses, wherein first waypoint 1784 thereof comprises a turnoff of a first (optional) detour 1889 thereof by which a mobile device 1200 may reach a suggested feature 1761 and wherein causing a presentation of a preferable media work 1220 before the mobile device reaches a first waypoint comprises presenting a preferable media work 1220 before the mobile device reaches a turnoff of a first detour 1889 toward a feature 1761, a method further comprising:

automatically updating a travel path 1788, 1888 thereof so as to include another waypoint 1784 within a geographical location containing a feature 1761 as a conditional response to an indication of a mobile device 1200 following a first detour 1889.

36. The media-presentation-conscious scheduling method of ANY one of the above method clauses, comprising:

obtaining an association 1233 between a map region 1723 corresponding to a geographical location 1762 containing a feature 1761 and a digital expression 1722 that identifies a feature 1761 in response to the feature 1761 having been named in a calendar event recorded in a mobile device 1200.

37. The media-presentation-conscious scheduling method of ANY one of the above method clauses, comprising:

obtaining an association 1233 between a map region 1723 corresponding to a geographical location 1762 containing a feature 1761 and a digital expression 1722 that identifies a feature 1761 in response to the feature 1761 having been named in a search performed via a mobile device 1200.

38. The media-presentation-conscious scheduling method of ANY one of the above method clauses, comprising:

automatically updating a playable content sequence 1480 as a conditional response to obtaining another media work 1220 by inserting an other media work 1220 before a first media work 1220 and so that a complete presentation of an other media work 1220 is scheduled to occur before a mobile device 1200 reaches a first waypoint 1784, wherein an other media work 1220 is preferred over a first media work 1220 partly based on a mode of transporting the mobile device 1200 and partly based on a digital expression 1722; and causing a presentation of a preferable media work 1220 before the mobile device reaches a first waypoint.

39. The media-presentation-conscious scheduling method of ANY one of the above method clauses, comprising:

invoking transistor-based circuitry (e.g., an instance of a navigation module 1631 and an update modules 1634 jointly) configured to update a travel path 1788, 1888 so as to include a substitute or other additional waypoint 1784 within a geographical location containing a recommended feature 1761 as a conditional response to an indication of a mobile device 1200 following a detour 1889 toward a recommended feature 1761.

40. The media-presentation-conscious scheduling method of ANY one of the above method clauses, comprising:

obtaining a modified itinerary 1685B signaling a prediction 1690 that a mobile device 1200 will encounter a download capacity shortage 173 conditionally as a result of a navigational route creation or change 1874;

41. The media-presentation-conscious scheduling method of ANY one of the above method clauses, wherein supplemental content 1493 is automatically and conditionally sequenced into an onboard presentation queue (implemented as a content sequence 1480, e.g.) as an automatic and conditional response to a predicted download capacity shortage 1683.

42. The media-presentation-conscious scheduling method of ANY one of the above method clauses, wherein one or more output modules 1634 (e.g. via an onboard presentation hardware 1212) present supplemental content 1493 comprising navigation guidance (via or otherwise) in a vicinity of a mobile device 1200 after automatically updating a travel path 1788, 1888 as a conditional response to detecting that the mobile device 1200 followed a first detour 1889 toward an another waypoint 1784 within a geographical location containing another feature 1761 previously suggested in a supplemental content 1493.

43. The media-presentation-conscious scheduling method of ANY one of the above method clauses, wherein sequencing a supplemental content 1493 into an onboard presentation queue with (at least) a second media work 1220 as an automatic and conditional response to a predicted download capacity shortage 1683 partly based on a navigational route creation or change 1874 and partly based on a first indication of a first connectivity impairment interval 1682 relative to a queued content total duration 1492, 1882 (e.g. computed as a difference or ratio thereof).

44. The media-presentation-conscious scheduling method of ANY one of the above method clauses, wherein sequencing supplemental content 1493 into an onboard presentation queue comprises:

obtaining an indication partly based on queue capacity 171 and partly based on download capacity 172 that a (correctable) download capacity shortage 173 currently exists within mobile device 1200; and downloading low definition playable data 1222 in lieu of corresponding high definition playable data 1221 until a download capacity shortage 173 is abated.

45. The media-presentation-conscious scheduling method of ANY one of the above method clauses, wherein obtaining a modified itinerary 1685B pertaining to a mobile device 1200 having undergone a navigational route creation or change 1874 comprises:

modifying a prior itinerary 1674 as a conditional response to a (command or other) explicit indication 1209 from a user 150 of a mobile device 1200 in regard to a navigational route creation or change 1874.

46. The media-presentation-conscious scheduling method of ANY one of the above method clauses, wherein obtaining a modified itinerary 1685B pertaining to a mobile device 1200 having undergone a navigational route creation or change 1874 comprises:

modifying a prior itinerary 1674 as a conditional response to an implicit indication 1209 from a user 150 of a mobile device 1200 in regard to a navigational route creation or change 1874, wherein an implicit indication 1209 comprises a creation or modification of a calendar event 1825 via an app 1214 resident in a mobile device 1200.

47. The media-presentation-conscious scheduling method of ANY one of the above method clauses, wherein obtaining a modified itinerary 1685B pertaining to a mobile device 1200 having undergone a navigational route creation or change 1874 comprises:
modifying a prior itinerary 1674 as a conditional response to an implicit indication 1209 from a user 150 of a mobile device 1200 in regard to a navigational route creation or change 1874, wherein an implicit indication 1209 comprises a ticket to a celebration 1823 or other event 1825 being purchased via a mobile device 1200.

48. The media-presentation-conscious scheduling method of ANY one of the above method clauses, wherein obtaining a modified itinerary 1685B pertaining to a mobile device 1200 having undergone a navigational route creation or change 1874 comprises:
modifying a prior itinerary 1674 as a conditional response to an implicit indication 1209 from a user 150 of a mobile device 1200 in regard to a navigational route creation or change 1874, wherein an implicit indication 1209 comprises a purchase (of an admission to a park 1812 or other facility 1815, e.g.) via a mobile device 1200.

49. The media-presentation-conscious scheduling method of ANY one of the above method clauses, wherein obtaining a modified itinerary 1685B pertaining to a mobile device 1200 having undergone a navigational route creation or change 1874 comprises:
modifying a prior itinerary 1674 as a conditional response to an implicit indication 1209 from a user 150 of a mobile device 1200 in regard to a navigational route creation or change 1874, wherein an implicit indication 1209 comprises one or more GPS coordinates 1451A-B of a mobile device 1200 indicating a suggested detour 1889 having been taken.

50. The media-presentation-conscious scheduling method of ANY one of the above method clauses, wherein connectivity impairment interval 1682 thereof indicates an interval of time during which no downloading to a mobile device is predicted to be possible (in an area with no service or on a flight in which one or more regulations require a mobile device to be in an "airplane mode" that prevents a mobile device from downloading playable date, e.g.).

51. The media-presentation-conscious scheduling method of ANY one of the above method clauses, wherein connectivity impairment interval 1682 thereof has a predicted duration 1882 greater than one hour.

52. The media-presentation-conscious scheduling method of ANY one of the above method clauses, wherein an affirmative decision to obtain a supplemental content in an onboard presentation queue results from a specific indication that a first connectivity impairment interval 1682 is long enough to cause the onboard presentation queue to empty before a mobile device 1200 reaches an end of a first connectivity impairment interval 1682.

53. The media-presentation-conscious scheduling method of ANY one of the above method clauses, wherein an affirmative decision to obtain a supplemental content in an onboard presentation queue results from a specific indication that a first connectivity impairment interval 1682 is long enough to cause the onboard presentation queue to empty before a mobile device 1200 reaches an end of the first connectivity impairment interval 1682 and wherein specific indication is partly based on a motor vehicle 180 bearing a mobile device 1200 being a travel mode 1602 of a particular segment 1672 of an itinerary 1685 and partly based on a behavioral prediction 1685 pertaining to a user of a mobile device 180 (e.g. listening or driving habits).

54. The media-presentation-conscious scheduling method of ANY one of the above method clauses, wherein an onboard presentation queue thereof is aboard a vehicle 180 but not within a mobile device 1200.

55. The media-presentation-conscious scheduling method of ANY one of the above method clauses, wherein an onboard presentation queue thereof is within a mobile device 1200.

56. The media-presentation-conscious scheduling method of ANY one of the above method clauses, wherein connectivity impairment interval 1682 thereof signals how long a vehicle 180 bearing a mobile device 1200 will (apparently) be unable to receive any content downloaded via an amplitude modulated radio signal 195.

57. The media-presentation-conscious scheduling method of ANY one of the above method clauses, wherein connectivity impairment interval 1682 thereof signals how long a vehicle 180 bearing a mobile device 1200 is predicted to be unable to receive any content downloaded via a cellular tower 192.

58. The media-presentation-conscious scheduling method of ANY one of the above method clauses, comprising:
causing a presentation at a mobile device of at least a second media work and a supplemental content according to an onboard presentation queue.

59. The media-presentation-conscious scheduling method of ANY one of the above method clauses, comprising:
presenting via a display screen of a mobile device 1200 at least a visual component of a second media work and of a supplemental content according to an onboard presentation queue.

60. The media-presentation-conscious scheduling method of ANY one of the above method clauses, comprising:
presenting via one or more speakers of a mobile device 1200 at least an auditory component of a second media work and of a supplemental content according to an onboard presentation queue.

61. The media-presentation-conscious scheduling method of ANY one of the above method clauses, wherein connectivity impairment interval 1682 thereof has a predicted duration 1882 greater than one minute.

62. The media-presentation-conscious scheduling method of ANY one of the above method clauses, wherein connectivity impairment interval 1682 thereof has a predicted duration 1882 greater than one hour.

63. The media-presentation-conscious scheduling method of ANY one of the above method clauses, wherein connectivity impairment interval 1682 thereof is estimated (at least partly) based on how long a mobile device 1200 will be unable to receive any content downloaded via a frequency modulated radio signal 195.

64. The media-presentation-conscious scheduling method of ANY one of the above method clauses, wherein connectivity impairment interval 1682 thereof is estimated based on how long a mobile device 1200 will be able to receive only content received as an amplitude modulated or frequency modulated radio signal 195.

65. The media-presentation-conscious scheduling method of ANY one of the above method clauses, wherein connectivity impairment interval 1682 thereof is estimated (at least partly) based on how long a mobile device 1200 will receive only content arriving to a mobile device 1200 as a broadcast radio signal 195.

66. The media-presentation-conscious scheduling method of ANY one of the above method clauses, wherein connectivity impairment interval 1682 thereof is estimated based on how long a mobile device 1200 will be able to receive only content downloaded via a cellular communication signal 195.

67. The media-presentation-conscious scheduling method of ANY one of the above method clauses, wherein connectivity impairment interval 1682 thereof is estimated (at least partly) based on how long a mobile device 1200 will be able to receive only content received via a wireless communication signal 195 transmitted (through air) from a local tower 192.

68. The media-presentation-conscious scheduling method of ANY one of the above method clauses, wherein connectivity impairment interval 1682 thereof is estimated based on how long a mobile device 1200 will be able to receive only content received via a wireless communication signal 195 transmitted from a communication satellite 191.

69. The media-presentation-conscious scheduling method of ANY one of the above method clauses, wherein connectivity impairment interval 1682 thereof is estimated (at least partly) based on how long a mobile device 1200 will be able to receive only content received via a wireless communication signal 195 that incurs a roaming charge.

70. The media-presentation-conscious scheduling method of ANY one of the above method clauses, wherein connectivity impairment interval 1682 thereof has a predicted duration 1882 greater than one minute.

71. The media-presentation-conscious scheduling method of ANY one of the above method clauses, wherein connectivity impairment interval 1682 thereof has a predicted duration 1882 greater than one hour.

72. (Independent) A media-presentation-conscious scheduling system comprising:

transistor-based circuitry (e.g., an instance of a navigation module 1631A) configured to obtain a first itinerary 1685A pertaining to a mobile device 1200;

transistor-based circuitry (e.g., a download module 1633A) configured to obtain a first streaming playable content sequence 1480 including (at least an identification of) first and second media works 1220;

transistor-based circuitry (e.g., an instance of a navigation module 1631B) configured to obtain a modified itinerary 1685B pertaining to a mobile device 1200 having (encountered or otherwise) undergone a navigational route creation or change 1874;

transistor-based circuitry (e.g., a prediction modules 1632A) configured to obtain a prediction 1690 that the modified itinerary 1685B will (apparently) encounter a first connectivity impairment interval 1682 conditionally as a result of the navigational route creation or change 1874;

transistor-based circuitry (e.g., a prediction modules 1632B and download module 1633A jointly) configured to trigger a (remotely transmitted sum or other) determination of a queued content total duration 1492 that is at least partly based on a (component) duration 1492 of (each of) the first and second media works 1220; and transistor-based circuitry (e.g., an instance of a sequencing modules 1637) configured to trigger an insertion of supplemental content 1493 into an onboard presentation queue with (at least) the second media work 1220 as an automatic and conditional response to a predicted download capacity shortage 1683 (at least partly) based on the navigational route creation or change 1874.

73. (Independent) A media-presentation-conscious scheduling system comprising:

transistor-based circuitry configured to obtain categorical first metadata 1175 pertaining to one or more programmed segments (e.g. as one or more events 861) of a first live stream 272, 472 during a presentation 289 of the first live stream 272, 472, wherein the categorical first metadata 1175 includes one or more category identifiers 1056, 1156 pertaining to the one or more programmed segments including a first programmed segment;

transistor-based circuitry configured to obtain a selection (e.g. manifested as an action 1182) of at least a first on-demand content item;

transistor-based circuitry configured to cause an interruption of the first live stream 272, 472 conditionally by causing an insertion of the first on-demand content item (e.g. an on-demand file 467 or other playable content 767, 1167 as an inserted on-demand event 561) so as to displace at least some of the first programmed segment as a conditional response to one or more indications 1183 of a first (implicit or other) user preference 1184 pertaining to the first on-demand content item; and transistor-based circuitry configured to cause an automatic resumption of the first live stream 272, 472 by causing a presentation 289 of the later-programmed second programmed segment after a presentation 289 of at least some of the first on-demand content item, wherein the presentation 289 of at least some of the first programmed segment is thereby omitted.

74. (Independent) A media-presentation-conscious scheduling system comprising:

transistor-based circuitry (e.g., an instance of a download module 1633 and sequencing module 1637 jointly) configured to obtain an association 1233 between a map region 1723 corresponding to a geographical location 1762 containing a feature 1761 and a digital expression 1722 that identifies the feature 1761;

transistor-based circuitry (e.g., an instance of a download module 1633 or sequencing module 1637) configured to obtain a first itinerary 1685 pertaining to a mobile device 1200, wherein the first itinerary 1685 includes the digital expression 1722 and identifies a travel path 1788, 1888 through a first waypoint 1784 of the map region 1723;

transistor-based circuitry (e.g., one or more download modules 1633 or programming modules 1636) configured to obtain a playable content sequence 1480 wherein first media work 1220 is scheduled for presentation before a mobile device 1200 reaches the first waypoint 1784;

transistor-based circuitry (e.g., an instance of a wireless signal receiver 1232 or download module 1633) configured to obtain a second media work 1220 that relates to the digital expression 1722 after the mobile device has begun traveling along the path 1788, 1888; transistor-based circuitry (e.g., one or more update modules 1634) configured to update the playable content sequence 1480 as an automatic and conditional response to obtaining the second media work 1220 by inserting the second media work 1220 so that a complete presentation of the second media work 1220 is scheduled to occur before the mobile device 1200 reaches the first waypoint 1784, wherein the second media work 1220 is (more highly scored according to a user preference profile or otherwise) preferred over the first media work 1220 (at least partly) based on a mode of transporting the mobile device 1200; and transistor-based circuitry (e.g., an instance of a transceiver or other output module 1634) configured to present or otherwise cause a presentation of the preferable media work 1220 before the mobile device reaches the first waypoint.

75. A media-presentation-conscious scheduling system configured to perform any one of the above method clauses or to implement either of the above system clauses, or any combination of these.

76. The system of ANY one of Clauses 72-75, wherein all of the transistor-based circuitry is implemented on a single application-specific integrated circuit 1440.

77. The system of ANY one of Clauses 72-75, wherein all of the transistor-based circuitry is borne by a single motorized passenger vehicle 180.

78. The system of ANY one of Clauses 72-75, wherein all of the transistor-based circuitry is implemented on a single circuit board 1570.

79. The system of ANY one of Clauses 72-75, wherein the transistor-based circuitry is distributed across two or more mutually remote facilities.

80. The system of ANY one of Clauses 72-75, configured to transmit connectivity metadata 165 thereof wirelessly (e.g. as depicted in FIG. 1).

81. The system of ANY one of Clauses 72-75, configured to transmit content metadata 175 thereof wirelessly (e.g. as depicted in FIG. 1).

82. The system of ANY one of Clauses 72-75, configured to transmit photographic and other images in a broadcast for inclusion in presentation 289 (e.g. as depicted in FIG. 2).

83. The system of ANY one of Clauses 72-75, configured to transmit photographic and other images in a simulcast for inclusion in presentation 289 (e.g. as depicted in FIG. 2).

84. The system of ANY one of Clauses 72-75, wherein one or more live content capture modules 346 (e.g. as depicted in FIG. 3) are configured to process a content stream 272 thereof into on-demand content 767.

85. The system of ANY one of Clauses 72-75, wherein one or more music catalog dynamic creation modules 346 (e.g. as depicted in FIG. 3) are configured to process a content stream 272 thereof into on-demand content 767.

86. The system of ANY one of Clauses 72-75, further comprising one or more content mapping modules 384 (e.g. as depicted in FIG. 3) so as to cause mapped content 767 to be included in presentation 289 (e.g. via one or more on-demand content delivery modules 394).

87. The system of ANY one of Clauses 72-75, wherein mobile cache or other temporary storage 618 (e.g. as depicted in FIG. 6) resides aboard a device 1200 configured to perform a presentation 289 to an end user 150.

88. The system of ANY one of Clauses 72-75, wherein one or more servers 1300 thereof (e.g. as depicted in FIG. 13) are configured to process metadata 1175 about such content arriving in a simulcast live stream 272B while the corresponding content is presented in a live stream 272A.

89. The system of ANY one of Clauses 72-75, wherein local presentation 289 thereof occurs in response to one or more event identifier retrieval modules 1191 residing in one or more remote servers 1300 (e.g. as depicted in FIGS. 11 & 13).

90. The system of ANY one of Clauses 72-75, wherein local presentation 289 thereof occurs in response to one or more event description retrieval modules 1192 residing in one or more remote servers 1300 (e.g. as depicted in FIGS. 11 & 13).

91. The system of ANY one of Clauses 72-75, wherein local presentation 289 thereof occurs in response to one or more on-demand content sequencing modules 1193 residing in one or more remote servers 1300 (e.g. as depicted in FIGS. 11 & 13).

92. The system of ANY one of Clauses 72-75, wherein local presentation 289 thereof occurs in response to one or more station item retrieval modules 1194 or other item retrieval modules 1195 residing in one or more remote servers 1300 (e.g. as depicted in FIGS. 11 & 13).

93. The system of ANY one of Clauses 72-75, wherein local presentation 289 thereof occurs in response to one or more content recommendation modules 1196 residing in one or more remote servers 1300 (e.g. as depicted in FIGS. 11 & 13).

94. The system of ANY one of Clauses 72-75, wherein local presentation 289 thereof occurs in response to one or more host description retrieval modules 1197 residing in one or more remote servers 1300 (e.g. as depicted in FIGS. 11 & 13).

95. The system of ANY one of Clauses 72-75, wherein local presentation 289 thereof occurs in response to one or more setlist item retrieval modules 1198 residing in one or more remote servers 1300 (e.g. as depicted in FIGS. 11 & 13).

96. The system of ANY one of Clauses 72-75, wherein local presentation 289 thereof occurs in response to one or more setlist description retrieval modules 1199 residing in one or more remote servers 1300 (e.g. as depicted in FIGS. 11 & 13).

97. The system of ANY one of Clauses 72-75, wherein local presentation 289 thereof occurs via a handheld device 1200 (e.g. as depicted in FIG. 14).

98. The system of ANY one of Clauses 72-75, wherein local presentation 289 thereof occurs via a handheld device 1200 (e.g. as depicted in FIG. 14).

99. The system of ANY one of Clauses 72-75, wherein GPS coordinates 1351 in a local device 1200 thereof affects a presentation 289 thereof.

100. The system of ANY one of Clauses 72-75, wherein predicted connectivity type 1352 in a local device 1200 thereof (e.g. comprising a connectivity impairment interval 1682, a download capacity shortage 1683, or a behavioral prediction 1685) thereof affects a presentation 289 thereof.

101. The system of ANY one of Clauses 72-75, wherein an itinerary 1685 thereof affects a presentation 289 thereof.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other such transitive, relational, or other connections do not generally exclude such variants, unless context dictates otherwise.

What is claimed is:

1. A media-presentation-conscious scheduling method comprising:
 obtaining by transistor-based circuitry of a mobile device an association between a map region corresponding to a geographical location containing a first feature and a digital expression that identifies said first feature;
 obtaining a first itinerary pertaining to said mobile device wherein said first itinerary includes said digital expression and identifies a travel path through a first waypoint of said map region;
 obtaining a playable content sequence wherein a first media work is scheduled for presentation before said mobile device reaches said first waypoint;

obtaining a second media work that relates to said digital expression after said mobile device has begun traveling along said path;

automatically updating said playable content sequence as a conditional response to obtaining said second media work by displacing said first media work and so that said playable content sequence programs a complete presentation of said second media work to occur before said mobile device reaches said first waypoint, wherein said second media work is preferred over said first media work partly based on a mode of transporting said mobile device and partly based on said digital expression that identifies said first feature being in a media work category that passengers of a vehicle category terminate with a lower-than-nominal frequency, wherein said lower-than-nominal frequency is measured as lower than a predetermined threshold frequency pertaining to said vehicle category; and causing a presentation of said second media work before said mobile device reaches said first waypoint.

2. The media-presentation-conscious scheduling method of claim 1, comprising:

obtaining a newfound media work that relates to said digital expression while said mobile device is traveling along said path; and presenting via one or more speakers of said mobile device at least an auditory component of said newfound media work according to an onboard presentation queue of said mobile device.

3. The media-presentation-conscious scheduling method of claim 1 comprising:

obtaining a newfound media work that relates to said digital expression while said mobile device is traveling along said path; and sequencing supplemental content into an onboard presentation queue with said newfound media work as an automatic and conditional response to a predicted download capacity shortage at least partly based on a navigational route change.

4. The media-presentation-conscious scheduling method of claim 1 comprising:

obtaining a newfound media work that relates to said digital expression while said mobile device is traveling along said path;

sequencing supplemental content into an onboard presentation queue with said newfound media work as an automatic and conditional response to a predicted download capacity shortage at least partly based on a navigational route change;

obtaining an indication partly based on queue capacity and partly based on download capacity that a download capacity shortage currently exists within mobile device; and downloading low definition playable data in lieu of corresponding high definition playable data until said download capacity shortage is abated.

5. The media-presentation-conscious scheduling method of claim 1 comprising:

obtaining a modified itinerary pertaining to said mobile device having undergone a navigational route change by modifying said first itinerary as a conditional response to an explicit indication from a user of said mobile device in regard to said navigational route change.

6. The media-presentation-conscious scheduling method of claim 1 comprising:

obtaining a modified itinerary pertaining to said mobile device having undergone a navigational route change by modifying said first itinerary as a conditional response to an implicit indication from a user of said mobile device in regard to said navigational route change wherein said implicit indication comprises a creation of or modification of a calendar event via an app resident in said mobile device.

7. The media-presentation-conscious scheduling method of claim 1 comprising:

automatically updating said travel path so as to exclude a second waypoint as a conditional response to an indication of said mobile device resuming said travel path past said first waypoint in lieu of following a first detour; and updating said playable content sequence to remove at least one reference to said first physical feature wherein said at least one reference relates to said digital expression that identifies said first physical feature.

8. The media-presentation-conscious scheduling method of claim 1 comprising:

automatically obtaining a modified itinerary signaling a prediction that said mobile device will encounter a download capacity shortage conditionally as a result off a navigational route change; and mitigating said download capacity shortage as an automatic and conditional response thereof.

9. The media-presentation-conscious scheduling method of claim 1 wherein one or more output modules present supplemental content comprising navigation guidance after automatically updating said travel path as a conditional response to detecting that said mobile device followed a first detour toward another waypoint within a geographical location containing a second feature previously suggested in said supplemental content.

10. The media-presentation-conscious scheduling method of claim 1 wherein said automatically updating said playable content sequence as said conditional response to obtaining said second media work by displacing said first media work and so that said playable content sequence programs said complete presentation of said second media work to occur before said mobile device reaches said first waypoint comprises:

determining that said mode of transporting said mobile device is aboard a vehicle based on said mobile device traveling along a vehicle travel path at a speed characteristic of said vehicle category.

11. The media-presentation-conscious scheduling method of claim 1 wherein said obtaining said association between said map region corresponding to said geographical location containing said first feature and said digital expression that identifies said first feature comprises:

obtaining said association between said map region corresponding to said geographical location containing said feature and said digital expression that identifies said feature in response to said feature having been named in a calendar event recorded in said mobile device.

12. The media-presentation-conscious scheduling method of claim 1 further comprising:

obtaining a modified itinerary signaling a prediction that said mobile device will encounter a first connectivity impairment interval conditionally as a result of a navigational route change; and automatically mitigating said first connectivity impairment interval by conditionally including supplemental content sequenced into an onboard presentation queue in response to a download capacity shortage resulting from said prediction that said mobile device will encounter said first connectivity impairment interval.

13. The media-presentation-conscious scheduling method of claim 1 further comprising:
obtaining a modified itinerary signaling a prediction that said mobile device will encounter a first connectivity impairment interval conditionally as a result of a navigational route change; and
automatically mitigating said first connectivity impairment interval as a conditional response to a predicted download capacity shortage.

14. The media-presentation-conscious scheduling method of claim 1 further comprising:
thereafter updating said travel path so as to include a second waypoint within said geographical location containing said first feature so as to signal that a navigational route change will thereafter include said second waypoint.

15. The media-presentation-conscious scheduling method of claim 1 wherein said first waypoint comprises a turnoff of a first detour by which said mobile device may reach said first feature and wherein causing said presentation of said second media work before said mobile device reaches said first waypoint comprises causing said presentation of said second media work before said mobile device reaches said turnoff of said first detour toward said first feature said method further comprising:
automatically updating said travel path so as to include a second waypoint within said geographical location containing said first feature as a conditional response to an indication of said mobile device following said first detour.

16. The media-presentation-conscious scheduling method of claim 1 wherein said automatically updating said playable content sequence as said conditional response to obtaining said second media work by displacing said first media work and so that said playable content sequence programs said complete presentation of said second media work to occur before said mobile device reaches said first waypoint comprises:
determining that said mode of transporting said mobile device is aboard a vehicle based on vehicle-indicative user input.

17. The media-presentation-conscious scheduling method of claim 1 wherein said automatically updating said playable content sequence as said conditional response to obtaining said second media work by displacing said first media work and so that said playable content sequence programs said complete presentation of said second media work to occur before said mobile device reaches said first waypoint comprises:
determining that said mode of transporting said mobile device is aboard a vehicle based on said mobile device traveling at a speed characteristic of a vehicle category that describes said vehicle; and
determining that said second media work is preferred over said first media work partly based on said mode of transporting said mobile device and partly based on said digital expression being in said media work category.

18. A media-presentation-conscious scheduling system comprising:
means for obtaining by transistor-based circuitry of a mobile device an association between a map region corresponding to a geographical location containing a first feature and a digital expression that identifies said first feature;
means for obtaining a first itinerary pertaining to said mobile device wherein said first itinerary includes said digital expression and identifies a travel path through a first waypoint of said map region;
means for obtaining a playable content sequence wherein a first media work is scheduled for presentation before said mobile device reaches said first waypoint;
means for obtaining a second media work that relates to said digital expression after said mobile device has begun traveling along said path;
means for automatically updating said playable content sequence as a conditional response to obtaining said second media work by displacing said first media work and so that said playable content sequence programs a complete presentation of said second media work to occur before said mobile device reaches said first waypoint, wherein said second media work is preferred over said first media work partly based on a mode of transporting said mobile device and partly based on said digital expression that identifies said first feature being in a media work category that passengers of said vehicle category terminate with a lower-than-nominal frequency, wherein said lower-than-nominal frequency is measured as lower than a predetermined threshold frequency pertaining specifically to said vehicle category; and
means for causing a presentation of said second media work before said mobile device reaches said first waypoint.

* * * * *